United States Patent
Otterstrom et al.

(10) Patent No.: US 12,429,716 B1
(45) Date of Patent: Sep. 30, 2025

(54) INTEGRATED PHOTONICS WITH ACTIVE POLARIZATION CONTROL

(71) Applicant: National Technology & Engineering Solutions of Sandia, LLC, Albuquerque, NM (US)

(72) Inventors: Nils Thomas Otterstrom, Edgewood, NM (US); Matt Eichenfield, Albuquerque, NM (US); Galen Hoffman, Georgetown, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 569 days.

(21) Appl. No.: 18/079,140

(22) Filed: Dec. 12, 2022

Related U.S. Application Data

(60) Provisional application No. 63/296,908, filed on Jan. 6, 2022.

(51) Int. Cl.
*G02F 1/01* (2006.01)

(52) U.S. Cl.
CPC .................................. *G02F 1/0142* (2021.01)

(58) Field of Classification Search
CPC ...................................................... G02F 1/0142
See application file for complete search history.

(56) References Cited

U.S. PATENT DOCUMENTS

| | | | |
|---|---|---|---|
| 9,122,006 B1* | 9/2015 | Roth | G02B 6/126 |
| 2003/0206676 A1* | 11/2003 | Ovadia | G02B 6/2766 |
| | | | 385/11 |
| 2021/0135421 A1* | 5/2021 | Davis | H01S 3/1003 |

OTHER PUBLICATIONS

Kiyat, I. et al., "A Compact Silicon-on-Insulator Polarization Splitter," IEEE Photonics Technology Letters (2005) 17(1):100-102.

\* cited by examiner

*Primary Examiner* — Thomas A Hollweg
*Assistant Examiner* — Marc E Manheim
(74) *Attorney, Agent, or Firm* — Mark A. Dodd

(57) ABSTRACT

An integrated photonics polarization controller that converts an input optical signal having a $TE_{00}$ mode into an output optical signal having any polarization on the Poincare sphere is disclosed. This polarization conversion and control requires splitting the input optical signal into two optical signals. The first optical signal retains its $TE_{00}$ mode, while the second optical signal must have a $TM_{00}$ mode, with the integrated photonics polarization controller generating this $TM_{00}$ mode either directly from the $TE_{00}$ mode or indirectly via an intermediate signal having a $TE_{10}$ mode. The magnitude and phase of the first and second optical signals are each controlled independently. The first and second optical signals are then combined to form an output optical signal and, due to the independent control of magnitude and phase of the first and second optical signals, the output optical signal may have any polarization on the Poincare sphere.

20 Claims, 15 Drawing Sheets

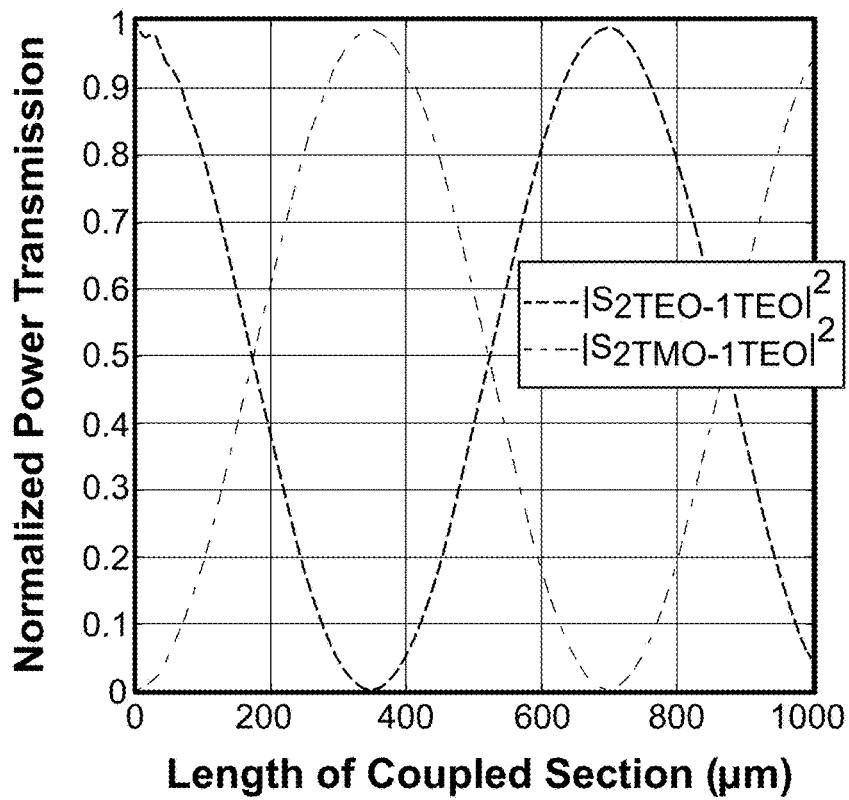
FIG. 12D
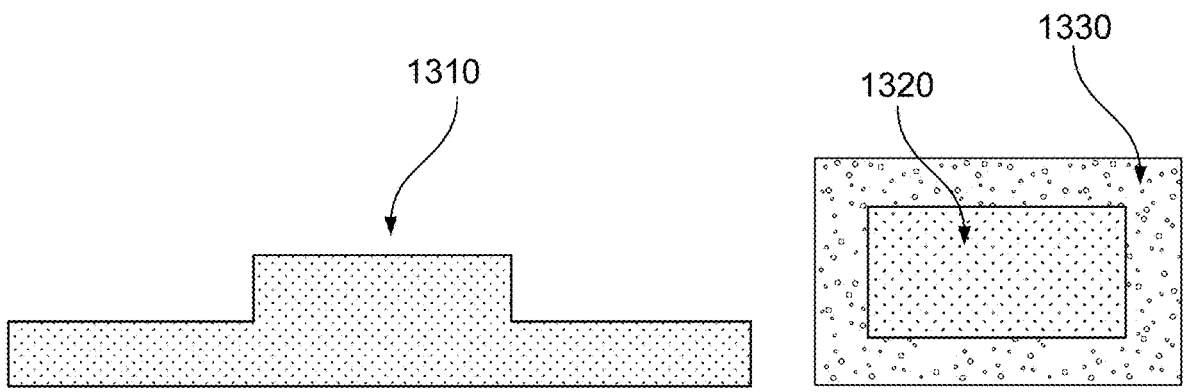
FIG. 13A
FIG. 13B

INTEGRATED PHOTONICS WITH ACTIVE POLARIZATION CONTROL

RELATED APPLICATIONS

This application claims priority to U.S. Provisional Application No. 63/296,908, filed on Jan. 6, 2022, and entitled INTEGRATED PHOTONICS WITH ACTIVE POLARIZATION CONTROL, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to an optical device that can convert and control an input optical signal having a given polarization mode into an output optical signal having any desired polarization mode on the entire Poincare sphere.

BACKGROUND

Various types of optical signal processing, atomic physics, quantum computing and communication, and quantum/classical sensing applications require the ability to control the state of polarization of ultraviolet (UV) or visible optical signals. One traditional approach to controlling polarization using integrated photonics employs two waveguides that each independently control the phase and amplitude of two copies of an incoming optical signal. These phase and amplitude adjusted signals are then combined using corresponding gratings oriented at 90° with respect to each other on a single chip. The two phase and amplitude adjusted signals are then focused by the corresponding gratings into free space off the chip. While this approach has a simple and symmetric chip design, the resultant output signal having the desired polarization is only formed off-chip, i.e., it is not compatible with fully integrated photonics on a single chip. Thus, the need exists for a device that can alter the polarization of an input optical signal to any desired polarization on the Poincare sphere while remaining compatible with fully integrated photonics. Stated differently, the output of the polarization controlling device must be a waveguide on the same chip as the input waveguide.

SUMMARY

One aspect of the present invention relates to an integrated photonics polarization controller that converts and controls an input optical signal having a $TE_{00}$ mode into an output optical signal having any polarization on the Poincare sphere. This polarization conversion requires splitting the input optical signal into two optical signals. The first optical signal retains its $TE_{00}$ mode, while the second optical signal must have a $TM_{00}$ mode, with the invention generating this $TM_{00}$ mode either directly from the $TE_{00}$ mode or indirectly via an intermediate signal having a $TE_{10}$ mode. The magnitude and phase of the first and second optical signals are each controlled independently. The first and second optical signals are then combined to form an output optical signal and, due to the independent control of magnitude and phase of the first and second optical signals, the output optical signal may have any desired polarization on the Poincare sphere.

In at least one embodiment of the invention, a polarization controller comprises a substrate, the substrate having formed thereon a 50-50 optical splitter (the 50-50 splitter receiving a $TE_{00}$ input optical signal, splitting the input optical signal into two thereby forming a first pair of intermediate optical signals, and outputting the first pair of intermediate optical signals), a pair of independent amplitude controllers (each independent amplitude controller receiving a corresponding one of the first pair of intermediate optical signals, independently controlling an amplitude of a corresponding one of the first pair of intermediate optical signals thereby forming a corresponding one of a second pair of intermediate optical signals, and outputting a corresponding one of the second pair of intermediate optical signals), a pair of independent phase controllers (each independent phase controller receiving a corresponding one of the second pair of intermediate optical signals, independently controlling a phase of a corresponding one of the second pair of intermediate optical signals thereby forming a corresponding one of a third pair of intermediate optical signals, and outputting a corresponding one of the third pair of intermediate optical signals), a mode converter/hybridizer (the mode converter/hybridizer receives a second of the third pair of intermediate optical signals, converting the second of the third pair of intermediate optical signals from a $TE_{00}$ mode to a $TM_{00}$ mode thereby forming a fourth intermediate optical signal, and outputting the fourth intermediate optical signal), and a polarization combiner (the polarization combiner receiving a first of the third pair of intermediate optical signals and the fourth intermediate optical signal, combining the first of the third pair of intermediate optical signals and the fourth intermediate optical signal thereby forming an output optical signal, and outputting the output optical signal), wherein a polarization of the output optical signal can be selected anywhere on the Poincare sphere based upon control of the pair of independent amplitude controllers and of the pair of independent phase controllers.

In various embodiments, one or more of the pair of independent amplitude controllers or the pair of independent phase controllers employs a thermo-optic effect, an electro-optic effect, or a piezoelectric effect; the mode converter/hybridizer converts the second of the third pair of intermediate optical signals from the $TE_{00}$ mode to a $TE_{10}$ mode and converts the second of the third pair of intermediate optical signals from the $TE_{10}$ mode to the $TM_{00}$ mode thereby forming the fourth intermediate optical signal; the mode converter/hybridizer includes a mode converter (the mode converter receives the second of the third pair of intermediate optical signals, converts the second of the third pair of intermediate optical signals from the $TE_{00}$ mode to the $TE_{10}$ mode, and outputs the second of the third pair of intermediate optical signals in the $TE_{10}$ mode), the mode converter/hybridizer further including a mode hybridizer (the mode hybridizer receives the second of the third pair of intermediate optical signals in the $TE_{10}$ mode, converts the second of the third pair of intermediate optical signals from the $TE_{10}$ mode to the $TM_{00}$ mode thereby forming the fourth intermediate optical signal, and outputs the fourth intermediate optical signal); and the mode converter includes a waveguide (the waveguide having a first region supporting the second of the third pair of intermediate optical signals in the $TE_{00}$ mode and a second region supporting the second of the third pair of intermediate optical signals in the $TE_{10}$ mode, the mode converter thereby converting the second of the third pair of intermediate optical signals from the $TE_{00}$ mode to the $TE_{10}$ mode).

In other embodiments, the mode converter includes an input waveguide (the input waveguide supporting the second of the third pair of intermediate optical signals in the $TE_{00}$ mode) and an output waveguide (the output waveguide supporting the second of the third pair of intermediate optical signals in the $TE_{10}$ mode, the output waveguide adjacent to the input waveguide, a coupling length for the input and output waveguides and an edge-to-edge separation of the input and output waveguides substantially maximizing the coupling between the input and output waveguides, the mode converter thereby converting the second of the third pair of intermediate optical signals from the $TE_{00}$ mode to the $TE_{10}$ mode); and the mode hybridizer includes a hybridizer portion (the hybridizer portion having a trapezoidal configuration in a direction of the second of the third pair of intermediate optical signals in the $TE_{10}$ mode, the hybridizer portion simultaneously supporting the second of the third pair of intermediate optical signals in the $TE_{10}$ mode and the fourth intermediate optical signal in the $TM_{00}$ mode), a cap layer (the cap layer on the hybridizer portion, an index of refraction of the cap layer being different than an index of refraction of the hybridizer portion), and a cladding layer (the cladding layer encapsulating the hybridizer portion and the cap layer, an index of refraction of the cladding layer being less than the index of refraction of the hybridizer portion and different than the index of refraction of the cap layer).

In at least one embodiment, the mode hybridizer includes an expansion region (the expansion region receiving the second of the third pair of intermediate optical signals in the $TE_{10}$ mode, a width of the expansion region increasing in a direction of the second of the third pair of intermediate optical signals), a hybridization portion (the hybridization portion adjacent the expansion region, the hybridization portion simultaneously supporting the second of the third pair of intermediate optical signals in the $TE_{10}$ mode and the fourth intermediate optical signal in the $TM_{00}$ mode), and a contraction region (the contraction region receiving the fourth intermediate optical signal in the $TM_{00}$ mode, a width of the contraction region decreasing in a direction of the fourth intermediate optical signal); and the mode converter/hybridizer includes a first transition region (the first transition region receiving the second of the third pair of intermediate optical signals in the $TE_{00}$ mode, a cross-sectional shape of the first transition region changing from a rectangular shape to an "L" shape in a direction of the second of the third pair of intermediate optical signals), an "L" shaped region (the "L" shaped region adjacent the first transition region, the "L" shaped region having an "L" shaped cross-sectional shape, the "L" shaped region simultaneously supporting the second of the third pair of intermediate optical signals in the $TE_{00}$ mode and the fourth intermediate optical signal in the $TM_{00}$ mode), and a second transition region (the second transition region adjacent the "L" shaped region, the second transition region receiving the fourth intermediate optical signal in the $TM_{00}$ mode, a cross-sectional shape of the second transition region changing from an "L" shape to a rectangular shape in a direction of the fourth intermediate optical signal).

In various embodiments, the mode converter/hybridizer includes a first transition region (the first transition region receiving the second of the third pair of intermediate optical signals in the $TE_{00}$ mode, a cross-sectional shape of the first transition region changing from a rectangular shape to a pair of offset squares in a direction of the second of the third pair of intermediate optical signals), an offset square region (the offset square region adjacent the first transition region, the offset square region having a pair of offset squares cross-sectional shape, the offset square region simultaneously supporting the second of the third pair of intermediate optical signals in the $TE_{00}$ mode and the fourth intermediate optical signal in the $TM_{00}$ mode), and a second transition region (the second transition region adjacent the offset square region, the second transition region receiving the fourth intermediate optical signal in the $TM_{00}$ mode, a cross-sectional shape of the second transition region changing from a pair of offset squares shape to a rectangular shape in a direction of the fourth intermediate optical signal).

In other embodiments, the polarization controller further comprises a mode filter (the mode filter removing a portion of the fourth intermediate optical signal having a $TE_{10}$ mode); the mode filter includes a passthrough waveguide (the passthrough waveguide receiving the fourth intermediate optical signal including the portion of the fourth intermediate optical signal having a $TE_{10}$ mode) and an arcing filter waveguide (the arcing filter waveguide coupling substantially all of the portion of the fourth intermediate optical signal having a $TE_{10}$ mode from the passthrough waveguide into the arcing filter waveguide), the passthrough waveguide outputting the fourth intermediate optical signal having substantially only the $TM_{00}$ mode; and the mode filter includes a tapered waveguide (the tapered waveguide receiving the fourth intermediate optical signal including the portion of the fourth intermediate optical signal having a $TE_{10}$ mode, radiating substantially all of the portion of the fourth intermediate optical signal having a $TE_{10}$ mode from the tapered waveguide, and outputting the fourth intermediate optical signal having substantially only the $TM_{00}$ mode).

In at least one embodiment, the 50-50 optical splitter, the pair of independent amplitude controllers, the pair of independent phase controllers, the mode converter/hybridizer, and/or the polarization combiner includes a partially-etched structure; the partially-etched structure includes a region adjacent to a waveguide structure having a thickness of between substantially 20% and substantially 80% of a thickness of the waveguide structure, and the waveguide structure and the region adjacent to the waveguide structure are formed of a same material; and the 50-50 optical splitter, the pair of independent amplitude controllers, the pair of independent phase controllers, the mode converter/hybridizer, and/or the polarization combiner includes a fully-etched structure; the fully-etched structure includes a region adjacent to a waveguide structure having a thickness of substantially 0% of a thickness of the waveguide structure.

In various embodiments, the substrate includes a Si substrate; the 50-50 optical splitter, the pair of independent amplitude controllers, the pair of independent phase controllers, the mode converter/hybridizer, and/or the polarization combiner includes a waveguide layer formed of one of $Al_2O_3$, $Si_3N_4$, Si, or Ge; and the 50-50 optical splitter, the pair of independent amplitude controllers, the pair of independent phase controllers, the mode converter/hybridizer, and/or the polarization combiner includes a waveguide cladding layer formed of $SiO_2$.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 4A illustrates a mode converter that may be used in a polarization controller in accordance with one or more embodiments of the present invention, while

FIGS. 5A and 5B illustrate a mode hybridizer in top down and cross-sectional views, respectively, that may be used in a polarization controller in accordance with one or more embodiments of the present invention, while

FIGS. 11A and 11B illustrate a mode converter/hybridizer in top down and cross-sectional views, respectively, that may be used in a polarization controller in accordance with one or more embodiments of the present invention, while

FIGS. 12A and 12B illustrate a mode converter/hybridizer in top down and cross-sectional views, respectively, that may be used in a polarization controller in accordance with one or more embodiments of the present invention, while FIGS. 12C and 12D illustrate simulation results for the mode hybridizer.

FIGS. 13A and 13B illustrate cross-sectional views of different fabrication methods that may be employed to fabricate a polarization controller in accordance with one or more embodiments of the present invention.

DETAILED DESCRIPTION

To convert an input optical signal having one polarization into an output optical signal having a different polarization, one must combine modes having different polarizations. This may be achieved in at least two different ways, corresponding to two different primary embodiments. It will be assumed that the input optical signal will be polarized in the $TE_{00}$ mode, i.e., in-plane polarized. In the first primary embodiment, this $TE_{00}$ mode is indirectly converted into a $TM_{00}$ mode, i.e., out-of-plane polarization, using a two-step process. The first step is to convert the $TE_{00}$ mode into the $TE_{10}$ mode followed by the second step, which converts the $TE_{10}$ mode into the desired $TM_{00}$ mode. In the second primary embodiment, the $TE_{00}$ mode is converted directly into the desired $TM_{00}$ mode. In each case, one must break symmetry and provide phase matching to simultaneously enable both efficient power transfer and a short transfer length, i.e., small device size. The first primary embodiment, i.e., the indirect approach, only breaks vertical symmetry, while the second primary embodiment, i.e., the direct approach, breaks both vertical and horizontal symmetry. The first and second primary embodiments will now be described in detail, with the overall polarization controller described first.

Overall Polarization Controller

Figure 1:
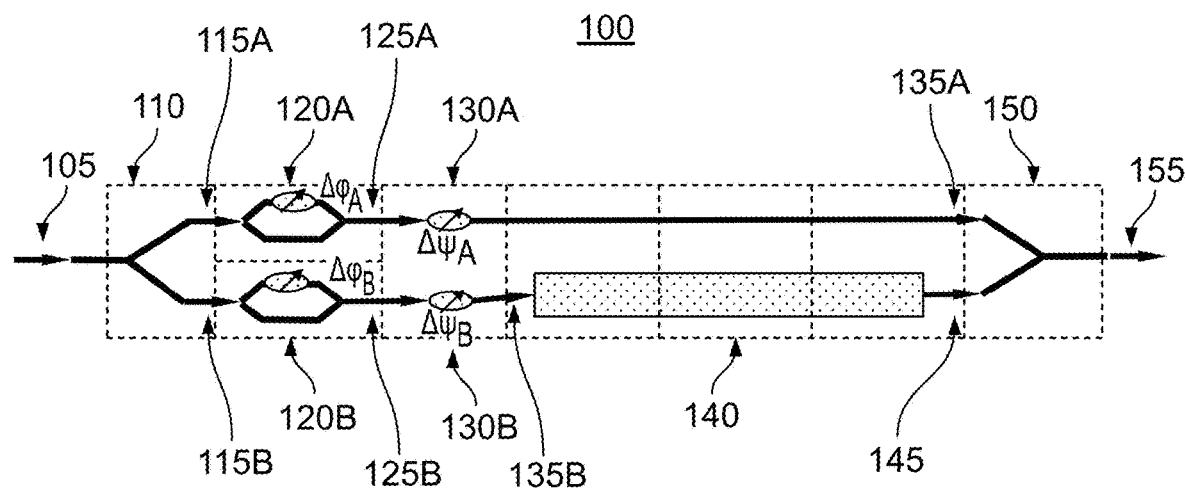
FIG. 1 illustrates a polarization controller in accordance with one or more embodiments of the present invention.

FIG. 1 illustrates a complete polarization controller 100 in accordance with at least one embodiment. As illustrated in FIG. 1, the polarization controller 100 includes a 50-50 optical splitter 110 that receives an input optical signal 105 having a $TE_{00}$ mode. The input optical signal 105 may be generated either on-chip, for example, by a laser fabricated on-chip (not illustrated), or off-chip and coupled to the chip, for example, by an input optical coupling grating (not illustrated). Each output optical signal 115A, 115B of the 50-50 optical splitter 110 then passes through a respective independent amplitude controller 120A, 120B. Each amplitude controller 120A, 120B may, for example, be implemented using a Mach-Zehnder modulator (MZM) to independently control an amplitude of a respective one of the optical signals 125A, 125B.

Each amplitude controlled optical signal 125A, 125B output by a respective independent amplitude controller 120A, 120B then passes through a respective independent phase controller 130A, 130B. Each independent phase controller 130A, 130B may, for example, be implemented using a phase shifter to independently control a phase of a respective one of the optical signals 135A, 135B. After passing through respective independent amplitude controllers 120A, 120B and respective independent phase controllers 130A, 130B, the optical signals 135A, 135B have had both their amplitude and phase independently controlled. The independent amplitude controllers 120A, 120B and the independent phase controllers 130A, 130B may, for example, employ elements based on the thermo-optic or electro-optic effect, or employ piezoelectrically actuated elements.

The optical signal 135B next passes through a polarization converter 140, which converts the optical signal 135B, having a $TE_{00}$ mode, into an optical signal 145 having a $TM_{00}$ mode. Both the optical signal 135A, having a $TE_{00}$ mode, and the optical signal 145, having a $TM_{00}$ mode, are combined using a polarization combiner 150, thereby generating an output optical signal 155 having the desired polarization, i.e., anywhere on the Poincare sphere. In certain embodiments, the output optical signal 155 is coupled to other optical components (not illustrated) on-chip. In other embodiments, the output signal optical 155 may be coupled to an output optical coupling grating (not illustrated), thereby permitting the output signal optical 155 to be coupled to off-chip optical components (not illustrated). In still other embodiments, the two optical signals 135A, 145 may be coupled to respective output optical coupling gratings (not illustrated), which are then focused into free space off-chip.

First (Indirect) Primary Embodiments

Figure 2:
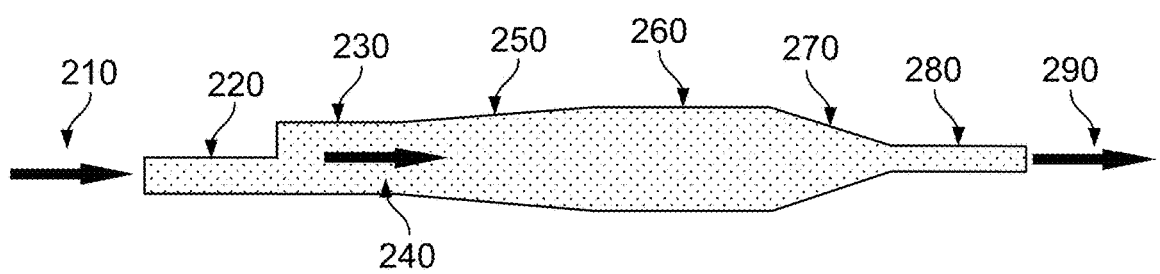
FIG. 2 illustrates a polarization converter that may be used in a polarization controller in accordance with one or more embodiments of the present invention.

FIG. 2 illustrates a polarization converter 200 in accordance with one embodiment of the first (indirect) primary embodiment. The polarization converter 200 receives an input optical signal 210, for example, corresponding to the optical signal 135B from the independent phase controller 130B illustrated in FIG. 1. The input optical signal 210 is in the $TE_{00}$ mode. The input optical signal 210 passes through a first waveguide region 220 having a first width $w_1$. The input optical signal 210 then passes through a second waveguide region 230 having a second width $w_2$. Due to the wider width of the second waveguide region 230, which matches the effective index of the $TE_{00}$ mode of the first waveguide with the effective index of the $TE_{10}$ mode of the second waveguide, the input optical signal 210 converts from the $TE_{00}$ mode to the $TE_{10}$ mode, supported by the second waveguide region 230, thereby becoming intermediate optical signal 240. The second waveguide region 230 thus serves the function of a mode converter. The intermediate optical signal 240 next passes through a third waveguide region 260 having a third width $w_3$. An expansion region 250 is located between the second waveguide region 230 and the third waveguide region 260. Within the third waveguide region 260, the intermediate optical signal 240 undergoes a mode change from the $TE_{10}$ mode to the $TM_{00}$ mode, thereby becoming output optical signal 290. The second third waveguide region 260 thus serves the function of a mode hybridizer. The output optical signal 290 then passes through a contraction region 270 and into a single mode waveguide 280. The output optical signal 290 passing through the single mode waveguide 280 corresponds to the optical signal 145 illustrated in FIG. 1.

Figure 3:
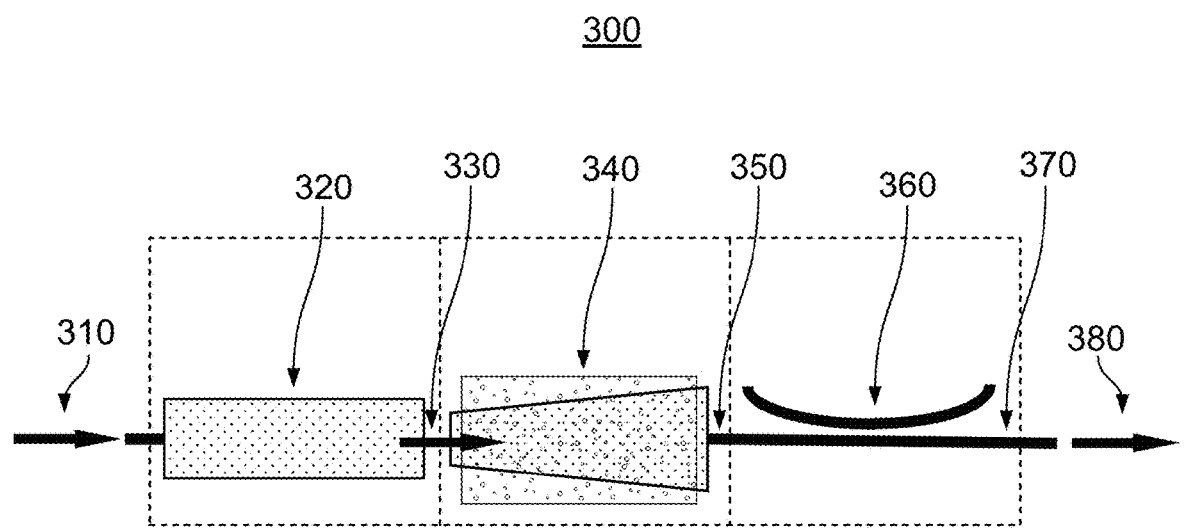
FIG. 3 illustrates a polarization converter that may be used in a polarization controller in accordance with one or more embodiments of the present invention.

FIG. 3 illustrates a polarization converter 300 in accordance with another embodiment of the first (indirect) primary embodiment. The polarization converter 300 receives an input optical signal 310, for example, corresponding to the optical signal 135B from the independent phase controller 130B illustrated in FIG. 1. The input optical signal 310 is in the $TE_{00}$ mode. The input optical signal 310 passes through a mode converter 320, which will be described below with respect to FIG. 4. As the input optical signal 310 passes through the mode converter 320, the mode converter 320 converts the input optical signal 310 from the $TE_{00}$ mode to the $TE_{10}$ mode, thereby becoming first intermediate optical signal 330. The first intermediate optical signal 330 next passes through a mode hybridizer 340, which will be described below with respect to FIGS. 5 and 6. Within the mode hybridizer 340, the first intermediate optical signal 330 undergoes a mode change from the $TE_{10}$ mode to the $TM_{00}$ mode, thereby becoming second intermediate optical signal 350. The second intermediate optical signal 350 then passes through a spatial mode filter 360, to be described below with respect to FIG. 7, in which any remaining $TE_{10}$ mode signal is removed from the second intermediate optical signal 350, thereby becoming the output optical signal 380. A single mode waveguide 370 carries the output optical signal 380 to the polarization combiner 150 illustrated in FIG. 1, with the output optical signal 380 corresponding to the optical signal 145.

Figure 4A:
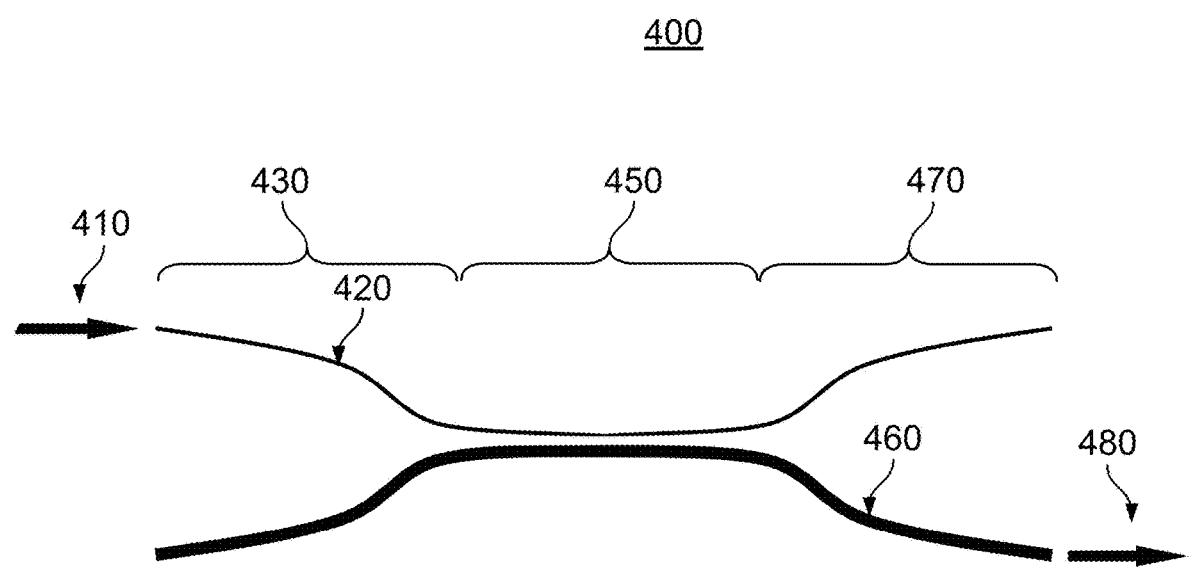
Figure 4B:
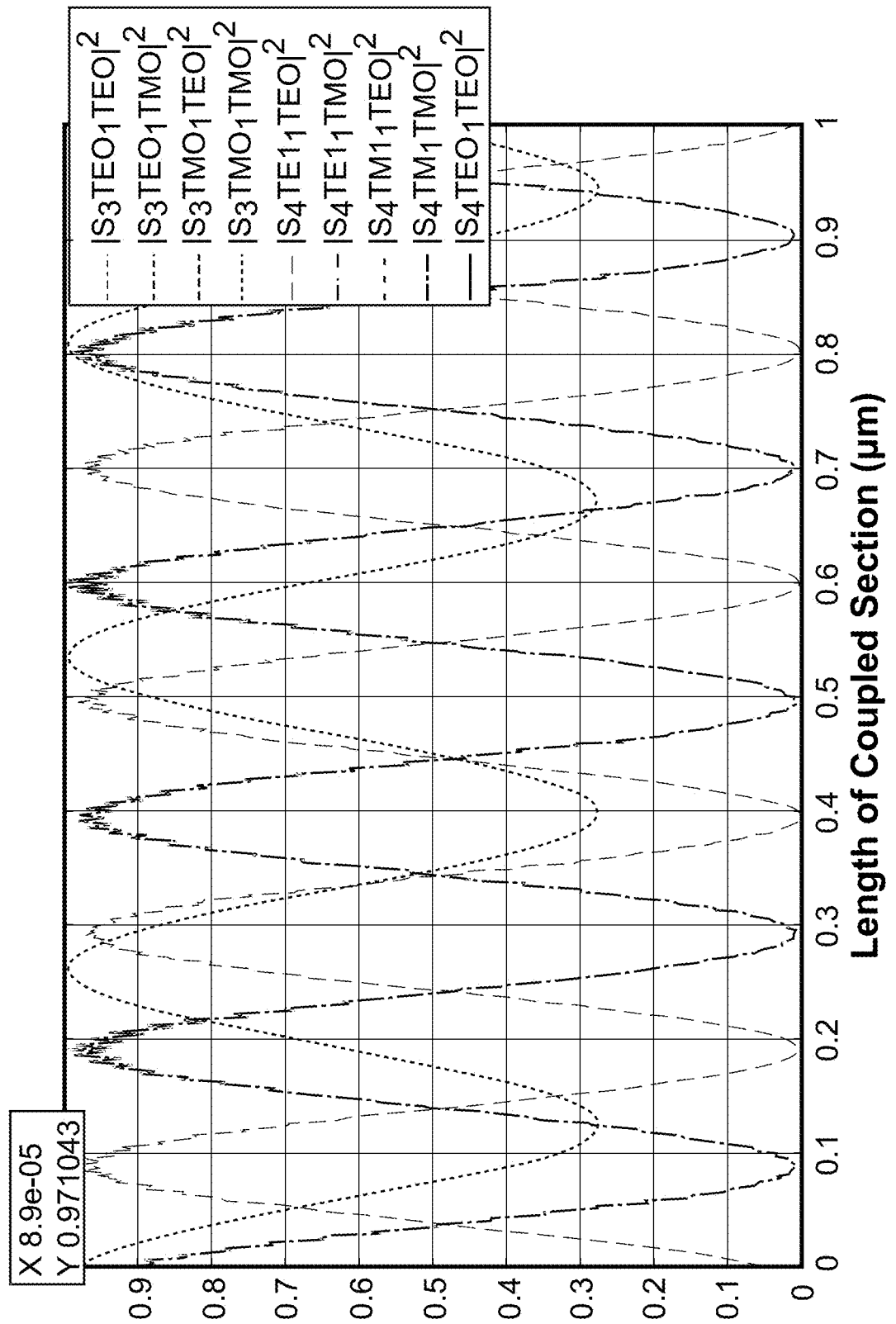
FIG. 4B illustrates simulation results for the mode converter.

FIG. 4A illustrates a mode converter 400 in accordance with one or more embodiments. The mode converter 400 includes an input waveguide 420 having a first width $w_1$, which receives the input optical signal 410 in the $TE_{00}$ mode. The input waveguide 420 includes a transition length 430 having a length $l_t$. The input waveguide 420 is designed to support the input optical signal 410 in the $TE_{00}$ mode, but will not support the $TE_{10}$ mode at the operating wavelength. Adjacent to the input waveguide 420 is an output waveguide 460 having a second width $w_2$, which outputs the output optical signal 480 in the $TE_{10}$ mode. The output waveguide 460 likewise includes a transition length 470 having a length $l_t$. The output waveguide 460 is designed to support the output optical signal 480 in the $TE_{10}$ mode at the operating wavelength. The input waveguide 420 and the output waveguide 460 are adjacent to each over a coupling portion 450 having a coupling length $l_c$ and separated by an edge-to-edge distance $l_s$. By using an electromagnetic field simulator, one can optimize the widths of the input waveguide 420 and the output waveguide 460, i.e., $w_1$ and $w_2$, the coupling length $l_c$, the edge-to-edge separation is between the input and output waveguides 420, 460, and the thickness t of the input and output waveguides 420, 460 as a function of the operating wavelength λ. FIG. 4B illustrates the simulation results for converting the $TE_{00}$ mode input optical signal 410 to the $TE_{10}$ mode output optical signal 480 at an operating wavelength of 435 nm. Table I provides the various parameters for this mode converter design at two different operating wavelengths: 435 nm and 729 nm. As illustrated in FIG. 4B, the coupling length $l_c$ in Table I corresponds to the first $TE_{10}$ output maximum at the 435 nm operating wavelength. Longer coupling lengths corresponding to later maximums may be used, but will result in longer devices that will suffer additional optical loss.

TABLE I

Design Parameters for Mode Converter.

| Parameter | Value | Value |
| --- | --- | --- |
| Operating Wavelength (λ) | 435 nm | 729 nm |
| Input Waveguide Width ($w_1$) | 400 nm | 400 nm |
| Output Waveguide Width ($w_2$) | 960 nm | 1100 nm |
| Waveguide Thickness (t) | 300 nm | 300 nm |
| Transition Length ($l_t$) | 100 μm | 100 μm |
| Coupling Length ($l_c$) | 89 μm | 3 μm |
| Edge-to-Edge Separation ($l_s$) | 300 nm | 300 nm |

Figure 5A:
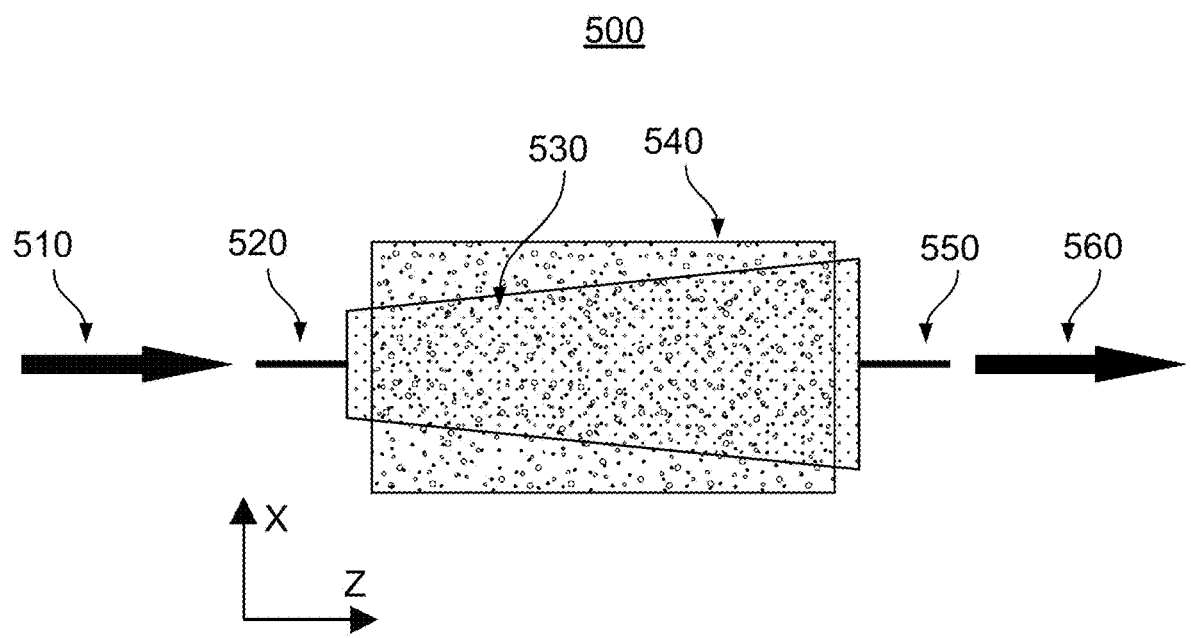
Figure 5B:
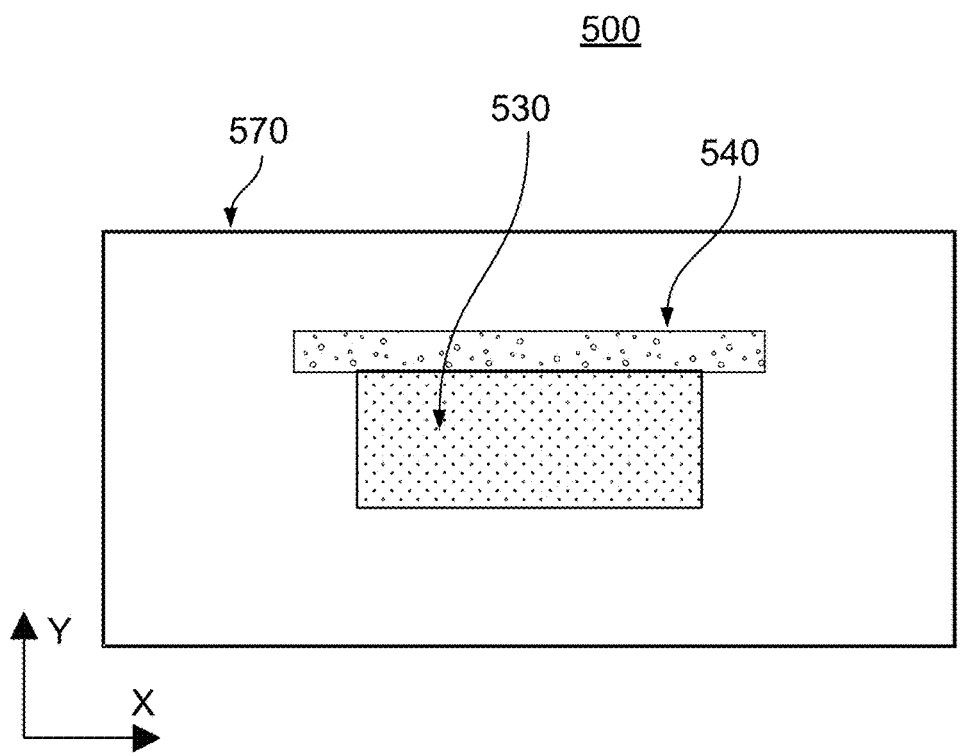
Figure 5C:
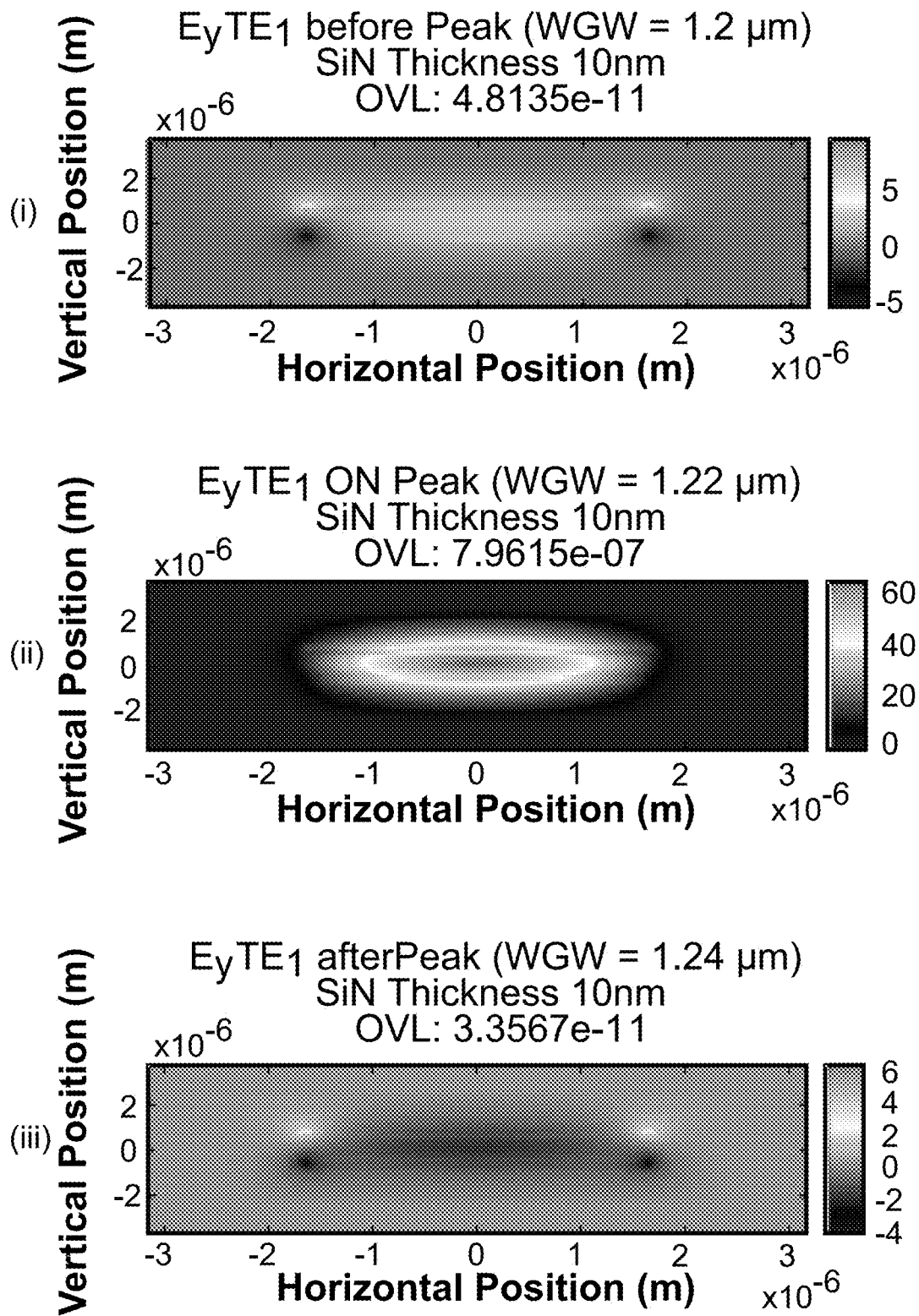
FIGS. 5C and 5D illustrate simulation results for the mode hybridizer.
Figure 5D:
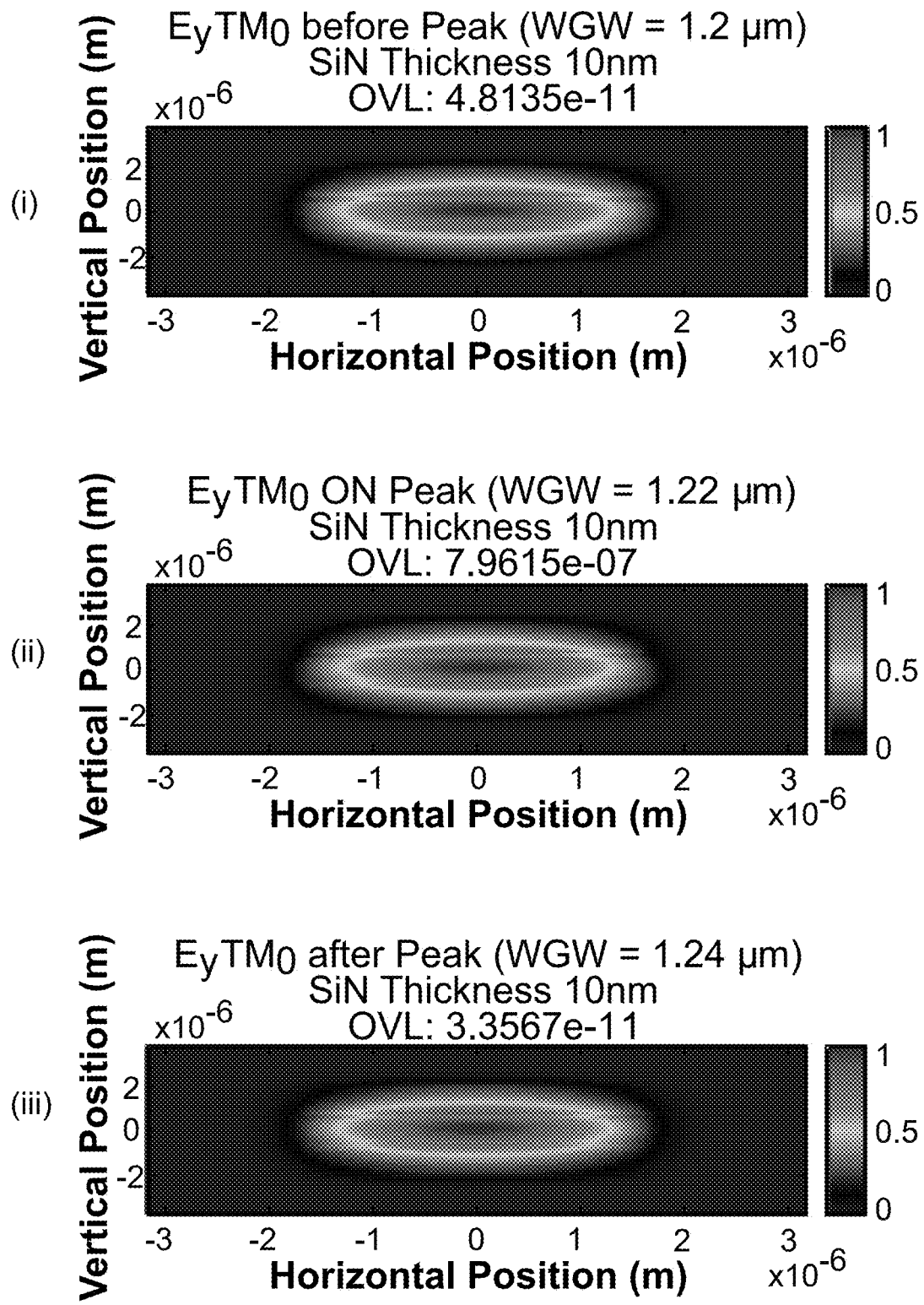

FIGS. 5A and 5B illustrate a first mode hybridizer 500 in accordance with one or more embodiments, with FIG. 5A illustrating a top down view, while FIG. 5B illustrates a cross-sectional view. As illustrated in FIG. 5A, the mode hybridizer 500 receives an input optical signal 510 having a $TE_{10}$ mode on an input waveguide 520. A hybridizer portion 530 of the mode hybridizer 500 has a trapezoidal configuration in the direction of the input optical signal 510, with the narrow end, having a width of $w_1$, coupled to the input waveguide 520, while the wide end is coupled to an output waveguide 550, having a width of $w_2$, which carries an output optical signal 560 having a $TM_{00}$ mode. As illustrated in FIG. 5B, a cap layer 540 is located adjacent the top of the hybridizer portion 530, while a cladding layer 570 encapsulates the hybridizer portion 530 and the cap layer 540 for waveguiding purposes. FIG. 5C illustrates the modeled vertical electric field $E_y$ for the $TE_{10}$ mode as a function of position within the hybridizer portion 530, with 5C(i), 5C(ii), and 5C(iii) corresponding to the input end, the center, and the output end of the hybridizer portion 530, respectively. FIG. 5D illustrates the modeled vertical electric field $E_y$ for the $TM_{00}$ mode as a function of position within the hybridizer portion 530, with 5D(i), 5D(ii), and 5D(iii) corresponding to the input end, the center, and the output end of the hybridizer portion 530, respectively. As illustrated in FIGS. 5C(ii) and 5D(ii), the vertical electric fields $E_y$ for the $TE_{10}$ mode and the $TM_{00}$ mode both strongly resonate, thereby permitting maximum conversion of the $TE_{10}$ mode input optical signal 510 to the $TM_{00}$ mode output optical signal 560.

As with the mode converter 400, by using an electromagnetic field simulator, one can optimize the widths at the input and output ends of the hybridizer portion 530, i.e., $w_1$ and $w_2$, the thickness of the hybridizer portion 530 $t_h$, the width $w_c$ of the cladding layer 570, and the thickness $t_c$ of the cap layer 540 as a function of the operating wavelength λ. In an exemplary embodiment, the hybridizer portion 530 is formed of $Al_2O_3$, the cap layer 540 is formed of $Si_3N_4$, while the cladding layer 570 is formed of $SiO_2$, i.e., the index of refraction of the cap layer 540 is greater than that of the hybridizer portion 530, while the index of refraction of the cladding layer 570 is less than that of the hybridizer portion 530. Note that in some embodiments the index of refraction of the cap layer 540 is less than that of the hybridizer portion 530, but in either case the index of refraction of the cap layer 540 is different from that of the cladding layer 570.

While the cap layer 540 in FIG. 5A is illustrated as a rectangle, the cap layer in other embodiments may have the same trapezoidal configuration in the direction of the input optical signal 510 as the hybridizer portion 530. Further, while the embodiment illustrated in FIG. 5A employs a cap layer 540 that is wider than the hybridizer portion 530, in other embodiments, the cap layer may be narrower than the hybridizer portion 530. In yet other embodiments, the mode hybridizer 500 will employ partial etching, as described below with reference to FIG. 13, instead of a cladding layer 570 and/or a cap layer 540. (The cross-sectional illustration in FIG. 5B reflects full etching of the waveguide layer to form the hybridizer portion 530.)

Figure 6:
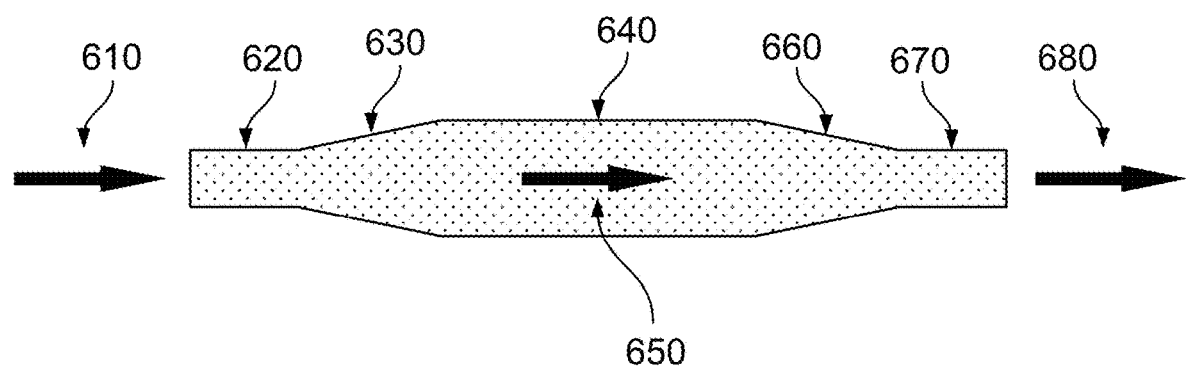
FIG. 6 illustrates a mode hybridizer that may be used in a polarization controller in accordance with one or more embodiments of the present invention.

FIG. 6 illustrates a second mode hybridizer 600 in accordance with one or more embodiments. An input optical signal 610, having a $TE_{10}$ mode, enters the mode hybridizer 600 via an input waveguide 620. The input waveguide 620 is coupled to a hybridization portion 640, having a width $w_h$ and a length $l_h$, via an expansion region 630, having a length $l_t$. The input optical signal 610 becomes an intermediate optical signal 650 within the hybridization portion 640. Within the hybridization portion 640, the intermediate optical signal 650 undergoes a mode change from the $TE_{10}$ mode to the $TM_{00}$ mode, thereby becoming output optical signal 680. The output optical signal 680 then passes through a contraction region 660, also having a length $l_t$, and into a single mode waveguide 670.

Again, using an electromagnetic field simulator, one can optimize the width $w_h$ and length $l_h$ of the hybridizer portion 640 and the length $l_t$ of the expansion region 630 and the contraction region 660, i.e., the transition length, as a function of the operating wavelength λ. Table II provides the various parameters for this mode hybridizer design at two different operating wavelengths: 435 nm and 729 nm.

TABLE II

Design Parameters for Mode Hybridizer.

| Parameter | Value | Value |
|---|---|---|
| Operating Wavelength (λ) | 435 nm | 729 nm |
| Hybridizer Width ($w_h$) | 1.23 μm | 1.17 μm |
| Hybridizer Length ($l_h$) | 345 μm | 100 μm |
| Transition Length ($l_t$) | 1 μm | 1 μm |

Figure 7:
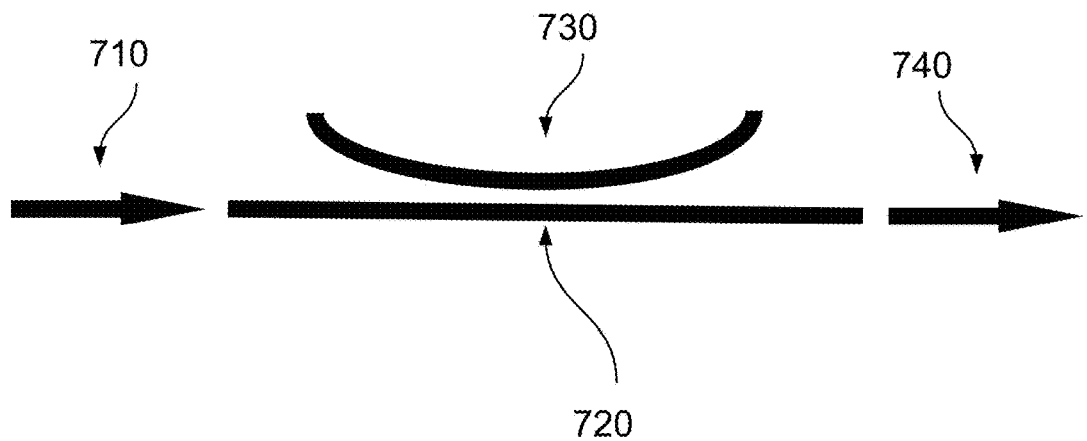
FIG. 7 illustrates a spatial mode filter that may be used in a polarization controller in accordance with one or more embodiments of the present invention.

FIG. 7 illustrates an optional spatial mode filter 700 in accordance with one or more embodiments having a passthrough waveguide 720 and an adjacent arcing filter waveguide 730. The passthrough waveguide 720 receives an input optical signal 710 that primarily includes the $TM_{00}$ mode, however, it may contain a small amount in the $TE_{10}$ mode, which should be removed. As the input optical signal 710 passes through the passthrough waveguide 720, the portion of the input optical signal 710 that is in the $TE_{10}$ mode couples to the arcing filter waveguide 730, thereby resulting in an output optical signal 740 that includes substantially only the $TM_{00}$ mode. This optical coupling can be implemented, for example, by phase matching the fundamental $TE_{00}$ mode of the arcing filter waveguide 730 to the $TE_{10}$ mode of the passthrough waveguide 720. In this manner, the unwanted $TE_{10}$ portion of the input optical signal 710 is coupled to the arcing filter waveguide 730, leaving substantially only the $TM_{00}$ mode in the output optical signal 740.

As an alternative to the optional spatial mode filter 700, one may also implement a filtering function to remove the $TE_{10}$ mode using a revised waveguide design. In particular, a waveguide could taper down in width such that only the fundamental $TE_{00}$ and $TM_{00}$ are supported. The unwanted $TE_{10}$ portion of the input optical signal is then radiated out of the waveguide. The contraction region 660 of the mode hybridizer 600 illustrated in FIG. 6 serves this filtering function that removes the unwanted $TE_{10}$ mode.

Figure 8:
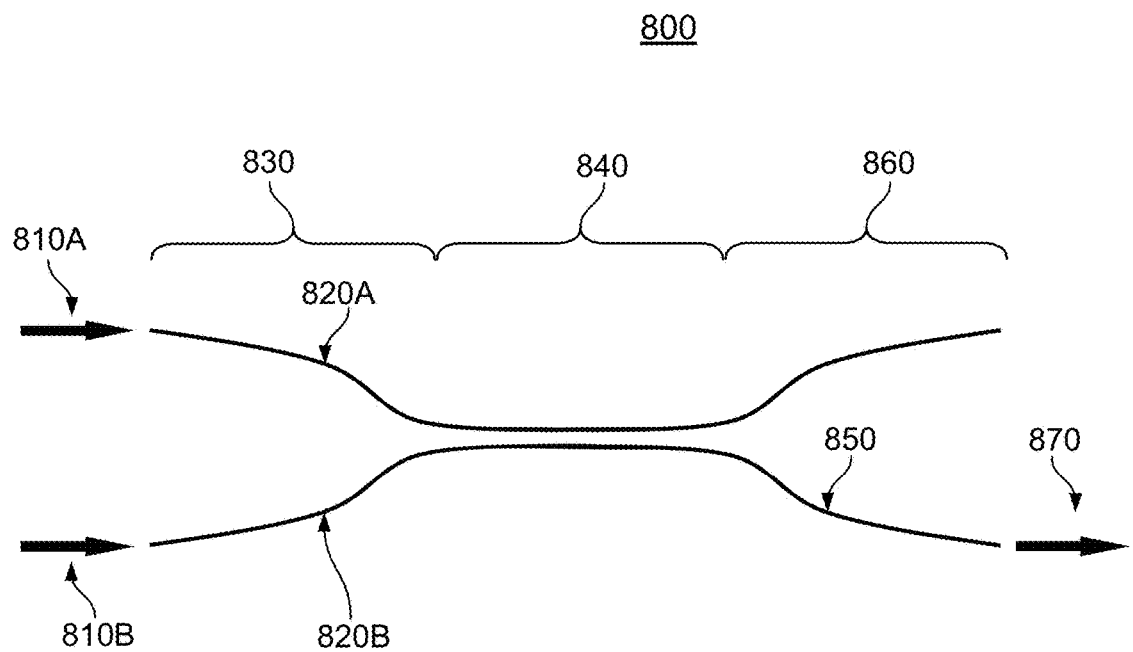
FIG. 8 illustrates a polarization combiner that may be used in a polarization controller in accordance with one or more embodiments of the present invention.

FIG. 8 illustrates a polarization combiner 800 in accordance with one or more embodiments that combines a first input optical signal 810A in the $TE_{00}$ mode and a second input optical signal 810B in the $TM_{00}$ mode to form an output optical signal 870 having the desired polarization on the Poincare sphere. See I. Kiyat et al., "A Compact Silicon-on-Insulator Polarization Splitter," IEEE Photonics Technology Letters, vol. 17, no. 1, pp. 100-102 (2005), the contents of which are incorporated herein by reference. The polarization combiner 800 includes input waveguides 820A, 820B having a width $w_i$, which receive the first and second input optical signals 810A, 810B, respectively. The input waveguides 820A, 820B include corresponding transition lengths 830 having a length $l_t$. The polarization combiner includes a coupling region 840, having a coupling length $l_c$ and an edge-to-edge separation between the input waveguides 820A, 820B of $l_s$, in which the first input optical signal 810A is coupled to the other input waveguide 820B. The thus coupled first and second input optical signals 810A, 810B create the output optical signal 870. The polarization combiner 800 includes an output waveguide 850 having a width $w_o$, which receives the output optical signal 870 from the coupling region 840. Like the input waveguides 820A, 820B, the output waveguide 850 includes a transition length 860 having a length $l_t$.

By again using an electromagnetic field simulator, one can optimize the widths of the input waveguides 820A, 820B and the output waveguide 850, i.e., $w_i$ and $w_o$, the coupling length $l_c$, the edge-to-edge separation is between the input waveguides 820A, 820B, and the thickness t of the input waveguides 820A, 820B and the output waveguide 850, and the transition length $l_t$ as a function of the operating wavelength λ. Table III provides the various parameters for this polarization combiner design at two different operating wavelengths: 435 nm and 729 nm.

TABLE III

Design Parameters for Polarization Combiner.

| Parameter | Value | Value |
|---|---|---|
| Operating Wavelength (λ) | 435 nm | 729 nm |
| Input Waveguide Width ($w_i$) | 400 nm | 400 nm |
| Output Waveguide Width ($w_o$) | 400 nm | 400 nm |

TABLE III-continued

Design Parameters for Polarization Combiner.

| Parameter | Value | Value |
|---|---|---|
| Waveguide Thickness (t) | 300 nm | 300 nm |
| Coupling Length ($l_c$) | 300 μm | 200 μm |
| Edge-to-Edge Separation ($l_s$) | 410 nm | 710 nm |
| Transition Length ($l_t$) | 100 μm | 100 μm |

Figure 9:
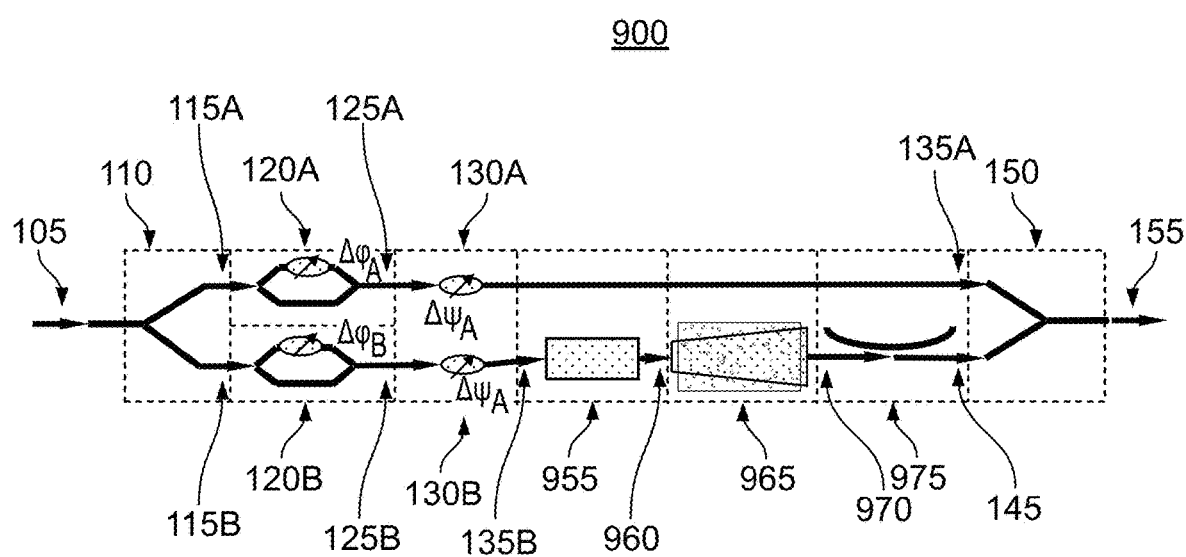
FIG. 9 illustrates a polarization controller in accordance with one or more embodiments of the present invention.

FIG. 9 illustrates a complete polarization controller 900 in accordance with at least one embodiment. As illustrated in FIG. 9, the polarization controller 900 includes a 50-50 optical splitter 110 that receives an input optical signal 105 having a $TE_{00}$ mode. Each output optical signal 115A, 115B of the 50-50 optical splitter 110 then passes through a respective independent amplitude controller 120A, 120B. Each amplitude controlled optical signal 125A, 125B output by a respective independent amplitude controller 120A, 120B then passes through a respective independent phase controller 130A, 130B. After passing through respective independent phase controllers 130A, 130B, the optical signals 135A, 135B have had both their amplitude and phase independently controlled.

The optical signal 135B next passes through a mode converter 955, which converts the optical signal 135B, having a $TE_{00}$ mode, into an optical signal 960 having a $TE_{10}$ mode. The optical signal 960 next passes through a mode hybridizer 965, which converts the optical signal 960, having a $TE_{10}$ mode, into an optical signal 970 having a $TM_{00}$ mode. The optical signal 970 next passes through an optional spatial mode filter 975, which removes any remaining portion of the optical signal 970 in the $TE_{10}$ mode, resulting in an optical signal 145 having substantially only the $TM_{00}$ mode. Both the optical signal 135A, having a $TE_{00}$ mode, and the optical signal 145, having a $TM_{00}$ mode, are combined using a polarization combiner 150, thereby generating an output optical signal 155 having the desired polarization, i.e., anywhere on the Poincare sphere.

Figure 10:
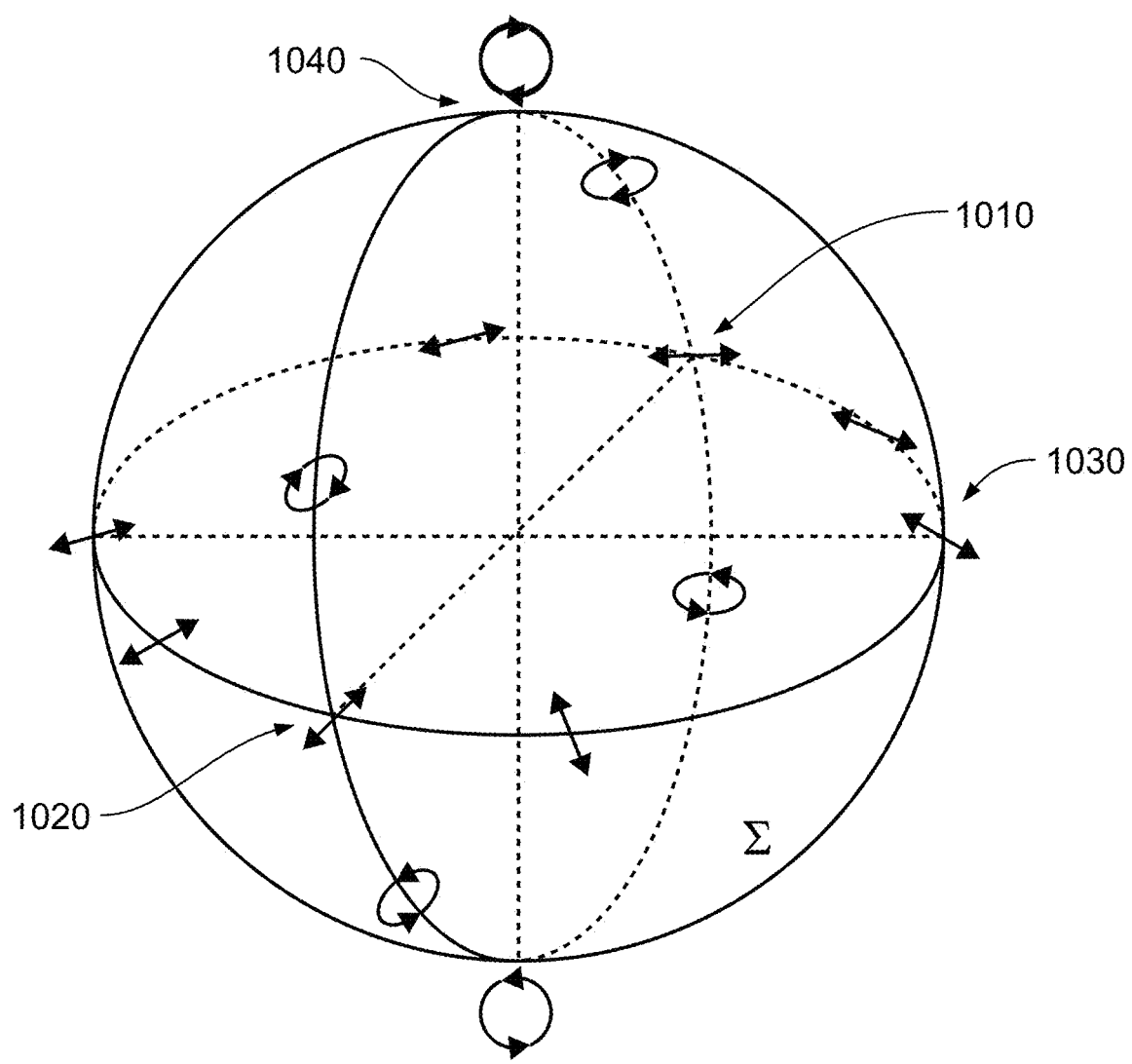
FIG. 10 illustrates a Poincare sphere with various polarizations that may be achieved by a polarization controller in accordance with one or more embodiments of the present invention.

The desired polarization is achieved by controlling the independent amplitude controllers 120A, 120B and the independent phase controllers 130A, 130B. FIG. 10 illustrates a Poincare sphere 1000, with four points of interest 1010, 1020, 1030, 1040. To achieve the polarization at point 1010, corresponding to a pure $TE_{00}$ mode, independent amplitude controllers 120A, 120B are set to no attenuation and full attenuation, respectively, while independent phase controllers 130A, 130B are set to no phase change. To achieve the polarization at point 1020, corresponding to a pure $TM_{00}$ mode, independent amplitude controllers 120A, 120B are set to full attenuation and no attenuation, respectively, while independent phase controllers 130A, 130B are set to no phase change. To achieve the polarization at point 1030, corresponding to an in-phase mix of $TE_{00}$ and $TM_{00}$ modes, independent amplitude controllers 120A, 120B are both set to no attenuation while independent phase controllers 130A, 130B are set to no phase change. To achieve the polarization at point 1040, corresponding to a circularly polarized mix of $TE_{00}$ and $TM_{00}$ modes, independent amplitude controllers 120A, 120B are both set to no attenuation while independent phase controllers 130A, 130B are set to no phase change and 90° phase change, respectively.

The polarization controller 900 illustrated in FIG. 9 may be altered in various ways in accordance with other embodiments. For example, the mode converter 955 may be replaced with the mode converter 400 illustrated in FIG. 4. Likewise, the mode hybridizer 965 may, for example, be replaced with the mode hybridizer 600 illustrated in FIG. 6. In yet other embodiments, the mode converter 955 and the mode hybridizer 965 may, for example, be replaced by the polarization converter 200 illustrated in FIG. 2.

Second (Direct) Primary Embodiments

Figure 11A:
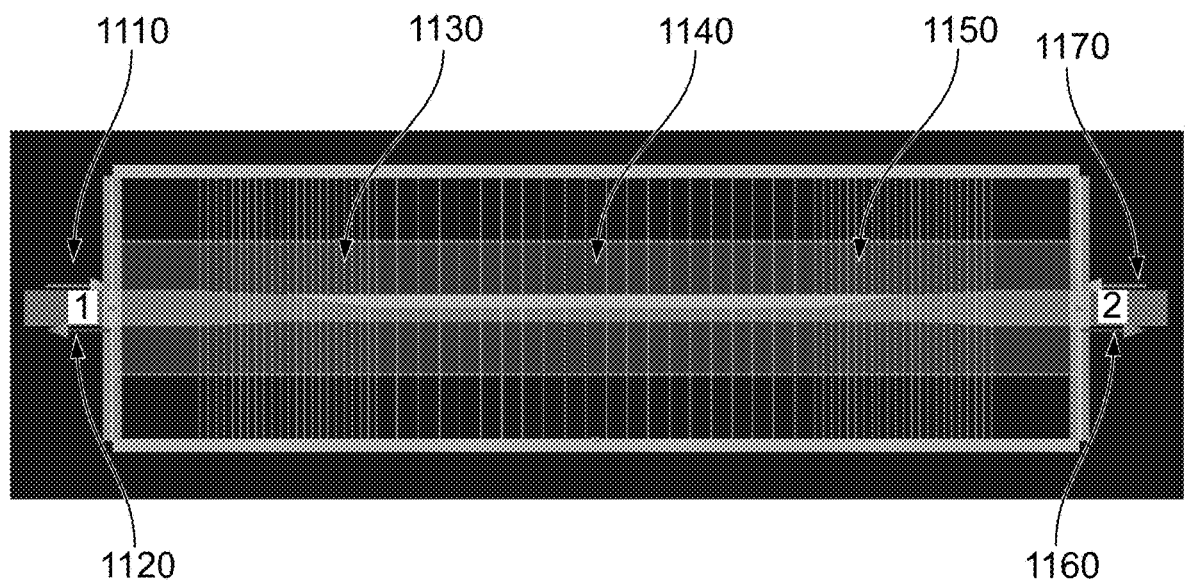
Figure 11B:
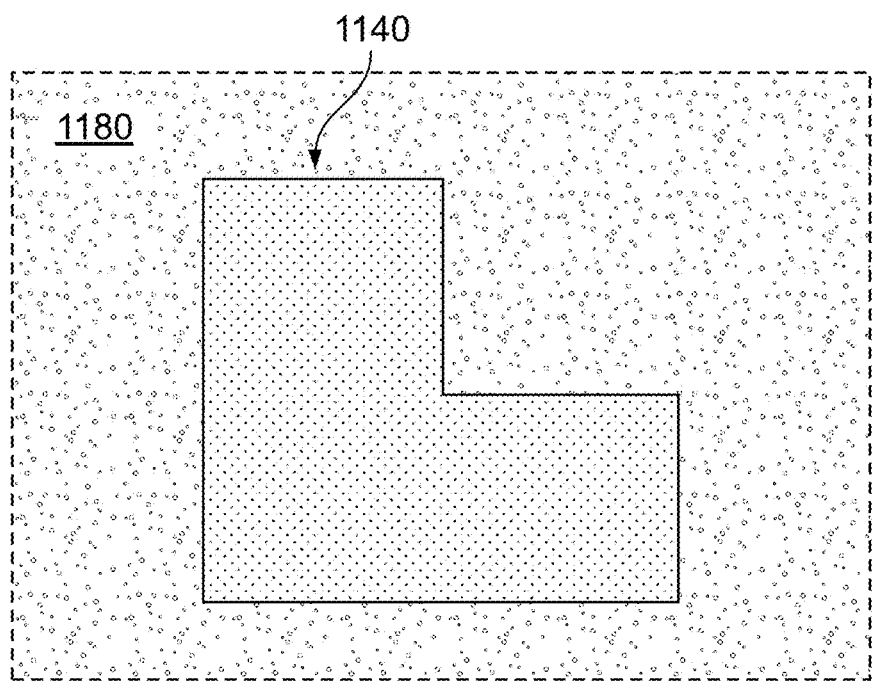
Figure 11C:
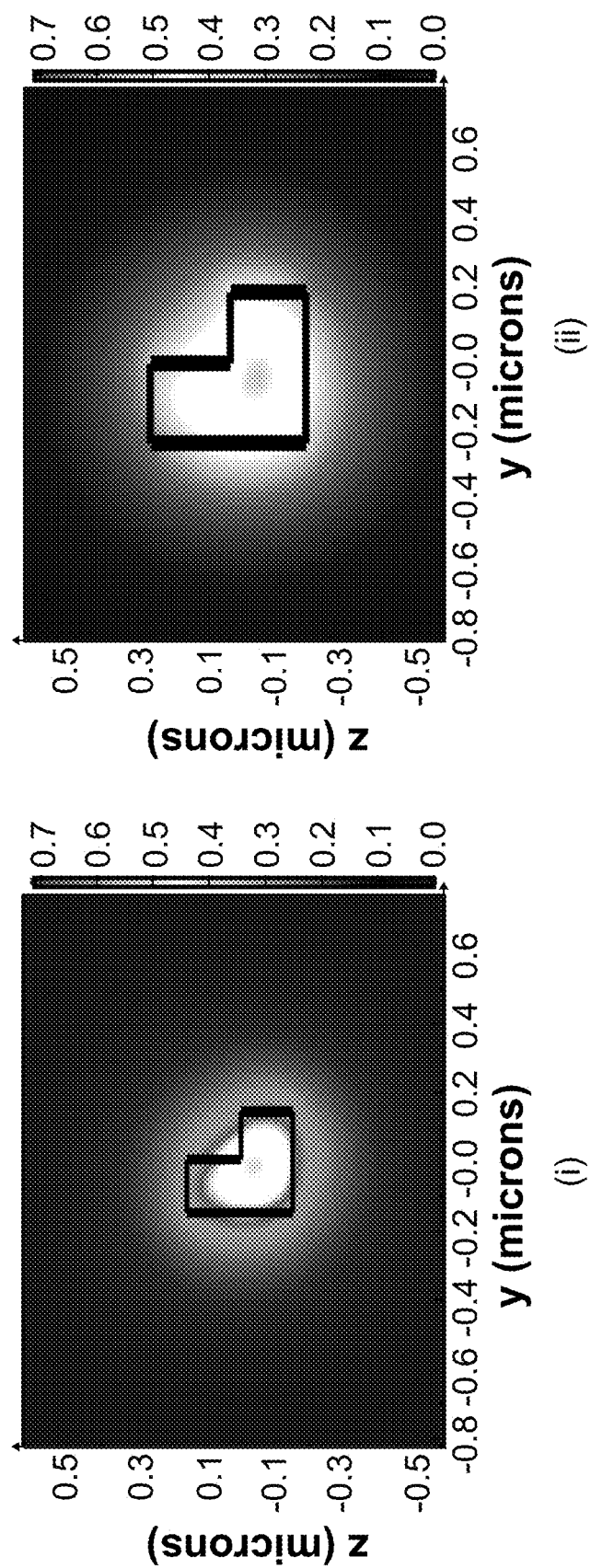
FIGS. 11C and 11D illustrate simulation results for the mode hybridizer.
Figure 11D:
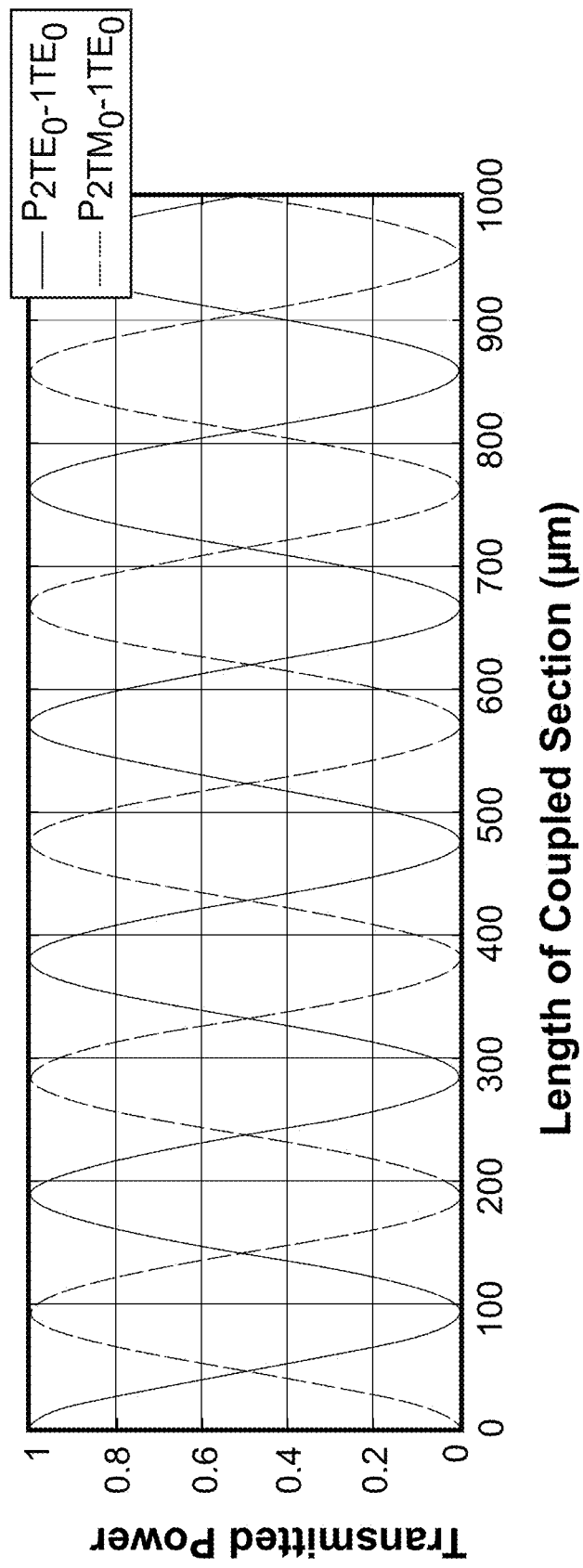

FIG. 11A illustrates a mode converter/hybridizer 1100 in accordance with a first embodiment of the second primary embodiment. The "L" shaped mode converter/hybridizer 1100 receives an input optical signal 1110 having a $TE_{00}$ mode on an input waveguide 1120. The input optical signal 1110 passes through a transition region 1130 into an "L" shaped region 1140 with a cladding layer 1180, as illustrated in FIG. 11B. The "L" shaped region 1140 breaks both the vertical and the horizontal symmetry of the input optical signal 1110, resulting in an output optical signal 1160 having a $TM_{00}$ mode, i.e., the mode converter/hybridizer 1100 directly converts the $TE_{00}$ mode input optical signal 1110 into the $TM_{00}$ output optical signal 1160. The $TM_{00}$ output optical signal 1160 passes from the "L" shaped region 1140 to an output optical waveguide 1170 via a transition region 1150. The height $h_L$ and the width $w_L$ of the "L" shaped region 1140 are both 300 nm leading to the modeled horizontal electric fields $E_{horiz}$ illustrated in FIGS. 11C(i) and 11C(ii) for the hybridized modes, respectively, at an operating wavelength of 420 nm. Due to the very large overlap and resulting hybridization of the $TE_{00}$ and $TM_{00}$ modes, the "L" shaped mode converter/hybridizer 1100 is very efficient at converting the $TE_{00}$ mode input optical signal 1110 directly into the $TM_{00}$ output optical signal 1160. The modeled conversion efficiency is illustrated in FIG. 11D as a function of the length of the "L" shaped region 1140 at an operating wavelength of 420 nm, with the first maximum occurring at 97 μm. The modeled mode converter/hybridizer 1100 employs a partially etched structure (as described below with reference to FIG. 13) with the input waveguide 1120, the transition region 1130, the "L" shaped region 1140, the transition region 1150, and the output optical waveguide 1170 being formed of $Al_2O_3$, with the cladding layer 1180 being formed of $SiO_2$. Other designs may include the use of an oxide trench to create a similar waveguide geometry that produces hybridization between the $TE_{00}$ and $TM_{00}$ modes.

Figure 12A:
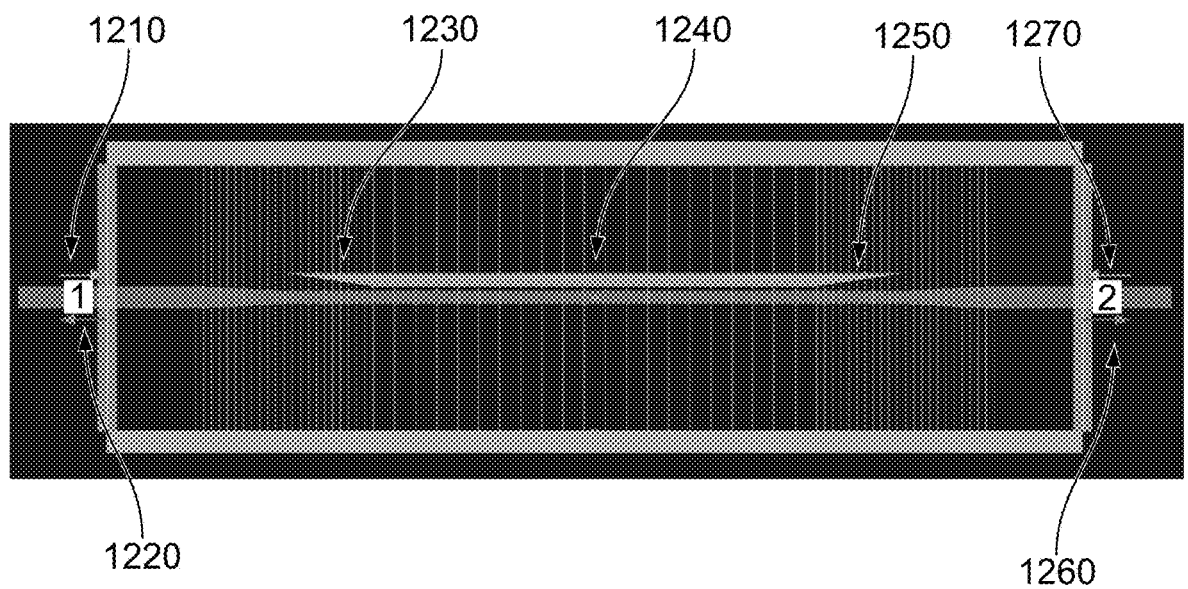
Figure 12B:
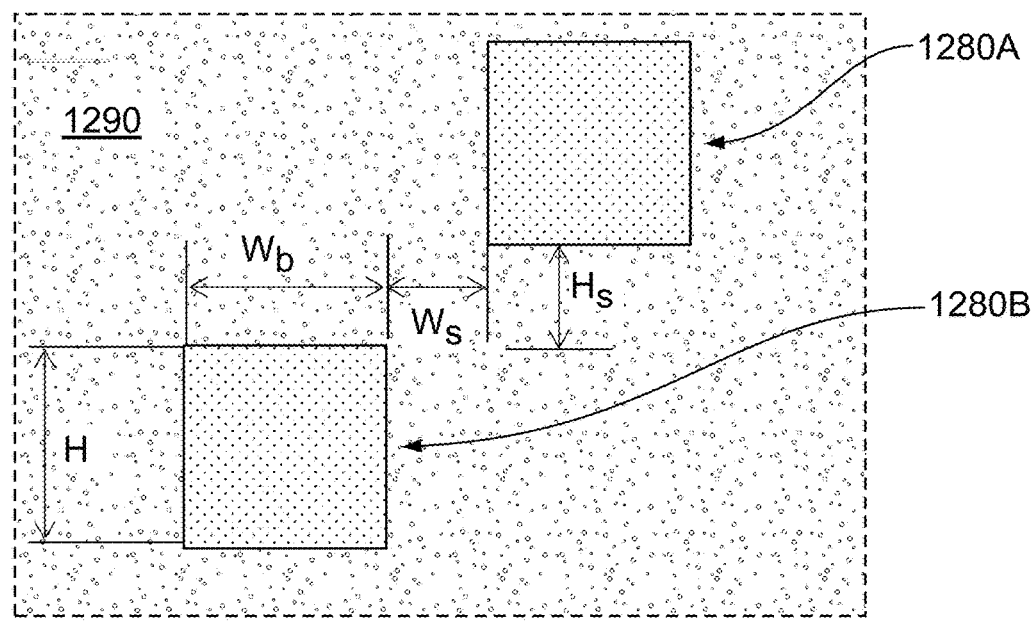
Figure 12C:
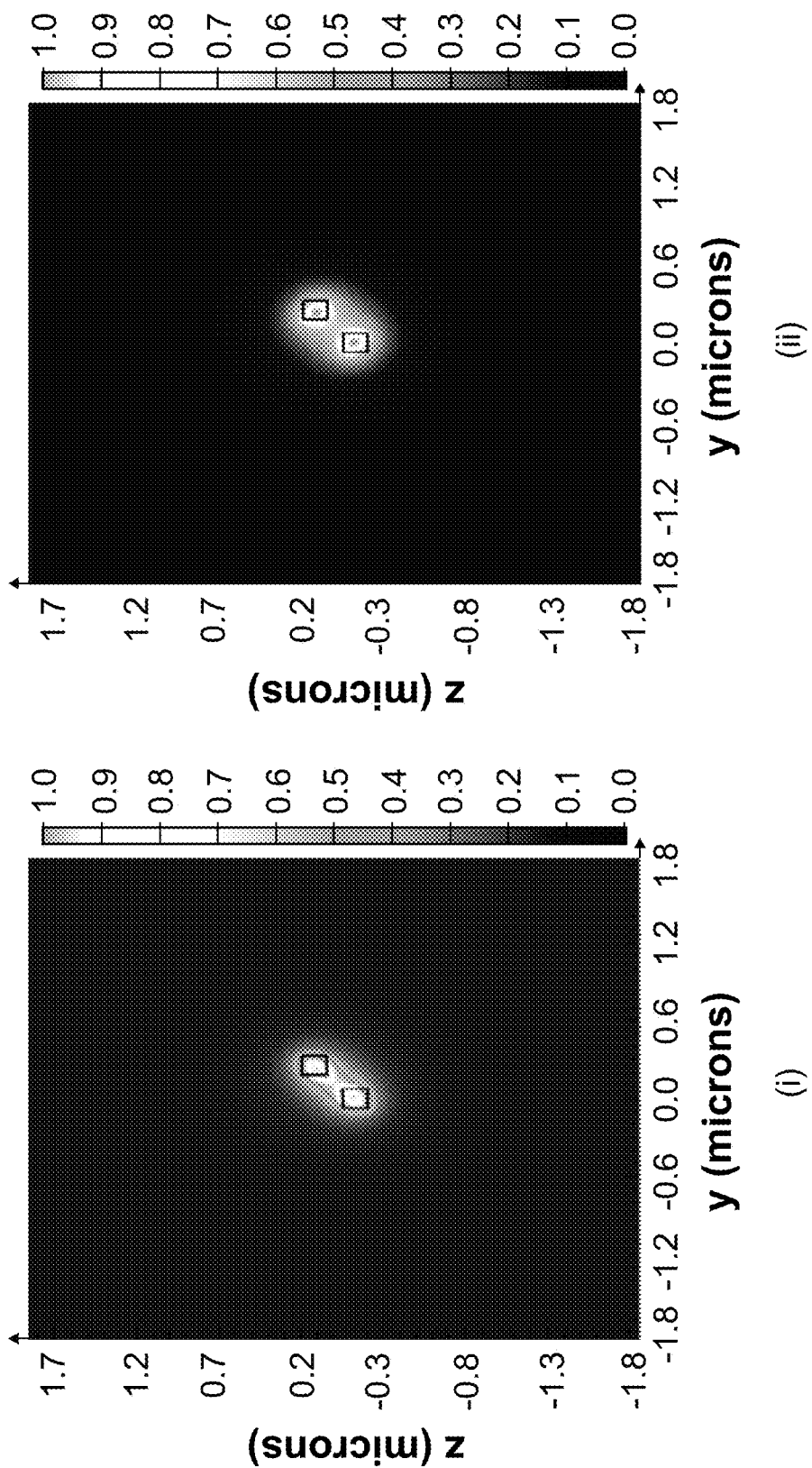

FIG. 12A illustrates a mode converter/hybridizer 1200 in accordance with a second embodiment of the second primary embodiment. The offset square mode shaped mode converter/hybridizer 1200 receives an input optical signal 1210 having a $TE_{00}$ mode on an input waveguide 1220. The input optical signal 1210 passes through a transition region 1230 into an offset square region 1240 having a pair of individual square waveguides 1280A, 1280B and a cladding layer 1290, as illustrated in FIG. 12B. The offset square region 1240 breaks both the vertical and the horizontal symmetry of the input optical signal 1210, resulting in an output optical signal 1260 having a $TM_{00}$ mode, i.e., the mode converter/hybridizer 1200 directly converts the $TE_{00}$ mode input optical signal 1210 into the $TM_{00}$ output optical signal 1260. The $TM_{00}$ output optical signal 1260 passes from the offset square region 1240 to an output optical waveguide 1270 via a transition region 1250. The height H and the width $W_b$ of each square 1280A, 1280B in the offset square region 1240 are both 150 nm, with the horizontal ($W_s$) and vertical ($H_s$) offsets being 50 nm, leading to the modeled horizontal electric fields $E_{horiz}$ illustrated in FIGS. 12C(i) and 12C(ii) for the hybridized modes, respectively, at an operating wavelength of 420 nm. Due to the very large overlap and resulting hybridization, the offset square mode converter/hybridizer 1200 is very efficient at converting the $TE_{00}$ mode input optical signal 1210 into the $TM_{00}$ output optical signal 1260. The modeled conversion efficiency is illustrated in FIG. 12D as a function of the length of the offset square region 1240 at an operating wavelength of 420 nm, with the first maximum occurring at 349 μm. In the modeled mode converter/hybridizer 1200, the input waveguide 1220, the transition region 1230, the "L" shaped region 1240, the transition region 1250, and the output optical waveguide 1270 are formed of $Al_2O_3$, with the cladding layer 1290 being formed of $SiO_2$.

A polarization controller employing either the "L" shaped mode converter/hybridizer 1100 or the offset square mode converter/hybridizer 1200 would be similar to the polarization controller 100 illustrated in FIG. 1. In each case, the polarization converter 140 would be replaced by either the "L" shaped mode converter/hybridizer 1100 or the offset square mode converter/hybridizer 1200, with the remainder of the optical circuit being the same.

Device Structure

Polarization controllers in accordance with both the first (indirect) and second (direct) primary embodiments are integrated photonics polarization controllers in that all elements are formed on a single substrate. The substrate may be formed of any suitable material. The substrate may, for example, be formed of Si or a low-loss (at the operating wavelength) dielectric material whose refractive index is sufficiently below that of the waveguide material to enable guiding of the modes required for hybridization. As will be appreciated by one of ordinary skill in the art, a Si substrate, in spite of its higher refractive index, may be employed due to the presence of a waveguide cladding layer having a lower refractive index between the waveguide layer and the substrate.

The waveguide layer may be formed of any suitable material. The waveguide layer may, for example, be formed of $Al_2O_3$, $Si_3N_4$, Si, or Ge. The primary factors in selecting the material for the waveguide layer is that it be essentially transparent at the operating wavelength and have an index of refraction greater than that of the waveguide cladding layer.

The waveguide cladding layer may be formed of any suitable material. The waveguide cladding layer may, for example, be formed of $SiO_2$. The primary factor in selecting the material for the waveguide cladding layer is that it has a lower index of refraction than the material used to form the waveguide layer. In addition, the larger the difference between the indices of refraction for the waveguide layer and the waveguide cladding layer, the shorter the minimum coupling length will be.

The waveguide cap layer may be formed of any suitable material. The waveguide cap layer may, for example, be formed of $Si_3N_4$, Si, or Ge. The primary factor in selecting the material for the waveguide cap layer is that it has a different index of refraction than the material used to form the waveguide layer and the material used to form the waveguide cladding layer. A secondary factor in selecting the material for the waveguide cap layer is that it does not induce high absorption loss at the operating wavelength.

Polarization controllers in accordance with both the first (indirect) and second (direct) primary embodiments may employ either a partially-etched or fully-etched device structure, as illustrated in FIGS. 13A and 13B, respectively. The overall thickness of the illustrated waveguide layer may, for example, be between approximately 250 nm and approximately 500 nm. With the partially-etched structure illustrated in FIG. 13A, etching may be used to remove, for example, between approximately 20% and 80% of the region adjacent the waveguide structure 1310. With the fully-etched structure illustrated in FIG. 13B, etching may be used to remove substantially all of the region adjacent the waveguide structure 1320. With the fully-etched structure, a cladding layer 1330 is required.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A polarization controller comprising:
   a substrate, the substrate having formed thereon:
      a 50-50 optical splitter adapted to receive a $TE_{00}$ input optical signal, to split the input optical signal into two thereby forming a first pair of intermediate optical signals, and to output the first pair of intermediate optical signals;
      a pair of independent amplitude controllers, each independent amplitude controller adapted to receive a corresponding one of the first pair of intermediate optical signals, to independently control an amplitude of a corresponding one of the first pair of intermediate optical signals thereby forming a corresponding one of a second pair of intermediate optical signals, and to output a corresponding one of the second pair of intermediate optical signals;
      a pair of independent phase controllers, each independent phase controller adapted to receive a corresponding one of the second pair of intermediate optical signals, to independently control a phase of a corresponding one of the second pair of intermediate thereby forming a corresponding one of a third pair of intermediate optical signals, and to output a corresponding one of the third pair of intermediate optical signals;
      a mode converter/hybridizer adapted to receive a second of the third pair of intermediate optical signals, to convert the second of the third pair of intermediate optical signals from a $TE_{00}$ mode to a $TM_{00}$ mode thereby forming a fourth intermediate optical signal, and to output the fourth intermediate optical signal; and
      a polarization combiner adapted to receive a first of the third pair of intermediate optical signals and the fourth intermediate optical signal, to combine the first of the third pair of intermediate optical signals and the fourth intermediate optical signal thereby forming an output optical signal, and to output the output optical signal;
   wherein a polarization of the output optical signal can be selected anywhere on the Poincare sphere based upon control of the pair of independent amplitude controllers and of the pair of independent phase controllers.

2. The polarization controller of claim 1, wherein one or more of the pair of independent amplitude controllers or the pair of independent phase controllers is adapted to employ one of a thermo-optic effect, an electro-optic effect, or a piezoelectric effect.

3. The polarization controller of claim 1, wherein the mode converter/hybridizer is adapted to convert the second of the third pair of intermediate optical signals from the $TE_{00}$ mode to a $TE_{10}$ mode and to convert the second of the third pair of intermediate optical signals from the $TE_{10}$ mode to the $TM_{00}$ mode thereby forming the fourth intermediate optical signal.

4. The polarization controller of claim 3,
wherein the mode converter/hybridizer includes a mode converter, the mode converter adapted to receive the second of the third pair of intermediate optical signals, to convert the second of the third pair of intermediate optical signals from the $TE_{00}$ mode to the $TE_{10}$ mode, and to output the second of the third pair of intermediate optical signals in the $TE_{10}$ mode; and
wherein the mode converter/hybridizer further includes a mode hybridizer, the mode hybridizer adapted to receive the second of the third pair of intermediate optical signals in the $TE_{10}$ mode, to convert the second of the third pair of intermediate optical signals from the $TE_{10}$ mode to the $TM_{00}$ mode thereby forming the fourth intermediate optical signal, and to output the fourth intermediate optical signal.

5. The polarization controller of claim 4, wherein the mode converter includes a waveguide having a first region adapted to support the second of the third pair of intermediate optical signals in the $TE_{00}$ mode and a second region adapted to support the second of the third pair of intermediate optical signals in the $TE_{10}$ mode, the mode converter thereby adapted to convert the second of the third pair of intermediate optical signals from the $TE_{00}$ mode to the $TE_{10}$ mode.

6. The polarization controller of claim 4, wherein the mode converter includes:
an input waveguide adapted to support the second of the third pair of intermediate optical signals in the $TE_{00}$ mode; and
an output waveguide adapted to support the second of the third pair of intermediate optical signals in the $TE_{10}$ mode, the output waveguide adjacent to the input waveguide, a coupling length for the input and output waveguides and an edge-to-edge separation of the input and output waveguides adapted to substantially maximize the coupling between the input and output waveguides, the mode converter thereby adapted to convert the second of the third pair of intermediate optical signals from the $TE_{00}$ mode to the $TE_{10}$ mode.

7. The polarization controller of claim 4, wherein the mode hybridizer includes:
a hybridizer portion having a trapezoidal configuration in a direction of the second of the third pair of intermediate optical signals in the $TE_{10}$ mode, the hybridizer portion adapted to simultaneously support the second of the third pair of intermediate optical signals in the $TE_{10}$ mode and the fourth intermediate optical signal in the $TM_{00}$ mode;
a cap layer on the hybridizer portion, an index of refraction of the cap layer being different than an index of refraction of the hybridizer portion; and
a cladding layer encapsulating the hybridizer portion and the cap layer, an index of refraction of the cladding layer being less than the index of refraction of the hybridizer portion and different than the index of refraction of the cap layer.

8. The polarization controller of claim 4, wherein the mode hybridizer includes:
an expansion region adapted to receive the second of the third pair of intermediate optical signals in the $TE_{10}$ mode, a width of the expansion region increasing in a direction of the second of the third pair of intermediate optical signals;
a hybridization portion adjacent the expansion region, the hybridization portion adapted to simultaneously support the second of the third pair of intermediate optical signals in the $TE_{10}$ mode and the fourth intermediate optical signal in the $TM_{00}$ mode; and
a contraction region adapted to receive the fourth intermediate optical signal in the $TM_{00}$ mode, a width of the contraction region decreasing in a direction of the fourth intermediate optical signal.

9. The polarization controller of claim 1, wherein the mode converter/hybridizer includes:
a first transition region adapted to receive the second of the third pair of intermediate optical signals in the $TE_{00}$ mode, a cross-sectional shape of the first transition region changing from a rectangular shape to an "L" shape in a direction of the second of the third pair of intermediate optical signals;
an "L" shaped region adjacent the first transition region, the "L" shaped region having an "L" shaped cross-sectional shape, the "L" shaped region adapted to simultaneously support the second of the third pair of intermediate optical signals in the $TE_{00}$ mode and the fourth intermediate optical signal in the $TM_{00}$ mode; and
a second transition region adjacent the "L" shaped region, the second transition region adapted to receive the fourth intermediate optical signal in the $TM_{00}$ mode, a cross-sectional shape of the second transition region changing from an "L" shape to a rectangular shape in a direction of the fourth intermediate optical signal.

10. The polarization controller of claim 1, wherein the mode converter/hybridizer includes:
a first transition region adapted to receive the second of the third pair of intermediate optical signals in the $TE_{00}$ mode, a cross-sectional shape of the first transition region changing from a rectangular shape to a pair of offset squares in a direction of the second of the third pair of intermediate optical signals;
an offset square region adjacent the first transition region, the offset square region having a pair of offset squares cross-sectional shape, the offset square region adapted to simultaneously support the second of the third pair of intermediate optical signals in the $TE_{00}$ mode and the fourth intermediate optical signal in the $TM_{00}$ mode; and
a second transition region adjacent the offset square region, the second transition region adapted to receive the fourth intermediate optical signal in the $TM_{00}$ mode, a cross-sectional shape of the second transition region changing from a pair of offset squares shape to a rectangular shape in a direction of the fourth intermediate optical signal.

11. The polarization controller of claim 1 further comprising a mode filter adapted to remove a portion of the fourth intermediate optical signal having a $TE_{10}$ mode.

12. The polarization controller of claim 11, wherein the mode filter includes:
a passthrough waveguide adapted to receive the fourth intermediate optical signal including the portion of the fourth intermediate optical signal having a $TE_{10}$ mode; and
an arcing filter waveguide adapted to couple substantially all of the portion of the fourth intermediate optical signal having a $TE_{10}$ mode from the passthrough waveguide into the arcing filter waveguide;

wherein the passthrough waveguide is adapted to output the fourth intermediate optical signal having substantially only the $TM_{00}$ mode.

13. The polarization controller of claim 11, wherein the mode filter includes a tapered waveguide adapted to receive the fourth intermediate optical signal including the portion of the fourth intermediate optical signal having a $TE_{10}$ mode, to radiate substantially all of the portion of the fourth intermediate optical signal having a $TE_{10}$ mode from the tapered waveguide, and to output the fourth intermediate optical signal having substantially only the $TM_{00}$ mode.

14. The polarization controller of claim 1, wherein at least one of the 50-50 optical splitter, the pair of independent amplitude controllers, the pair of independent phase controllers, the mode converter/hybridizer, or the polarization combiner includes a partially-etched structure.

15. The polarization controller of claim 14,
wherein the partially-etched structure includes a region adjacent to a waveguide structure having a thickness of between substantially 20% and substantially 80% of a thickness of the waveguide structure; and
wherein the waveguide structure and the region adjacent to the waveguide structure are formed of a same material.

16. The polarization controller of claim 1, wherein at least one of the 50-50 optical splitter, the pair of independent amplitude controllers, the pair of independent phase controllers, the mode converter/hybridizer, or the polarization combiner includes a fully-etched structure.

17. The polarization controller of claim 16, wherein the fully-etched structure includes a region adjacent to a waveguide structure having a thickness of substantially 0% of a thickness of the waveguide structure.

18. The polarization controller of claim 1, wherein the substrate includes a Si substrate.

19. The polarization controller of claim 1, wherein at least one of the 50-50 optical splitter, the pair of independent amplitude controllers, the pair of independent phase controllers, the mode converter/hybridizer, or the polarization combiner includes a waveguide layer formed of one of $Al_2O_3$, $Si_3N_4$, Si, or Ge.

20. The polarization controller of claim 1, wherein at least one of the 50-50 optical splitter, the pair of independent amplitude controllers, the pair of independent phase controllers, the mode converter/hybridizer, or the polarization combiner includes a waveguide cladding layer formed of $SiO_2$.

* * * * *